United States Patent
Narumi et al.

(10) Patent No.: US 9,392,135 B2
(45) Date of Patent: Jul. 12, 2016

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Kazuki Narumi, Komae (JP); Naoko Baba, Kawasaki (JP); Yasunori Fujimoto, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/680,817

(22) Filed: Apr. 7, 2015

(65) Prior Publication Data

US 2015/0296098 A1    Oct. 15, 2015

(30) Foreign Application Priority Data

Apr. 11, 2014 (JP) ................. 2014-082125

(51) Int. Cl.
| | |
|---|---|
| H04N 1/04 | (2006.01) |
| H04N 1/00 | (2006.01) |
| H04N 1/401 | (2006.01) |
| B41J 2/21 | (2006.01) |

(52) U.S. Cl.
CPC ............... *H04N 1/04* (2013.01); *B41J 2/2132* (2013.01); *H04N 1/00681* (2013.01); *H04N 1/4015* (2013.01)

(58) Field of Classification Search
CPC ............ H04N 2201/0094; H04N 1/4053; H04N 1/04; H04N 1/40087; H04N 1/4095; H04N 1/6027; G09G 2310/0235; G09G 2320/0271; G09G 2320/0646; G09G 2330/021; G09G 2354/00; G09G 2356/00; G09G 2360/16

USPC .............. 358/1.9, 3.06, 1.2, 474, 3.1, 3.27; 399/72, 30, 394, 50, 74; 382/112, 131, 382/141, 164, 190, 195, 239, 263

See application file for complete search history.

(56) References Cited

U.S. PATENT DOCUMENTS

| | | | | |
|---|---|---|---|---|
| 5,075,785 A | * | 12/1991 | Sugishima | H04N 1/3873 358/296 |
| 5,748,772 A | * | 5/1998 | Moro et al. | 382/167 |
| 7,705,906 B2 | * | 4/2010 | Watanabe | H04N 5/3572 348/246 |
| 7,898,575 B2 | * | 3/2011 | Ishii | H04N 3/1562 348/222.1 |
| 2005/0100358 A1 | * | 5/2005 | Ushio | G03G 15/36 399/82 |
| 2007/0046706 A1 | * | 3/2007 | Kayahara et al. | 347/14 |

(Continued)

FOREIGN PATENT DOCUMENTS

JP    2008-87369 A    4/2008

*Primary Examiner* — Negussie Worku

(74) *Attorney, Agent, or Firm* — Canon U.S.A., Inc. IP Division

(57) ABSTRACT

There is provided an image processing apparatus for recording an image on a unit region of a recording medium by performing a plurality of relative scanning operations of the recording medium and a recording head including a plurality of recording elements arranged in a certain direction. The image processing apparatus stores, based on image data of the image and ratios of using a plurality of recording element groups for recording the image, each of the plurality of recording element groups including a different recording element, dot count values for the plurality of recording element groups, and determines, based on the stored dot count values, whether density correction data for correcting the image data needs to be generated.

10 Claims, 17 Drawing Sheets

(56) References Cited

U.S. PATENT DOCUMENTS

| | | | |
|---|---|---|---|
| 2007/0171294 A1* | 7/2007 | Watanabe | H04N 5/3572 348/340 |
| 2008/0123148 A1* | 5/2008 | Takahashi et al. | 358/3.13 |
| 2009/0244578 A1* | 10/2009 | Sasayama | 358/1.9 |
| 2012/0081441 A1* | 4/2012 | Miyake et al. | 347/15 |
| 2012/0098839 A1* | 4/2012 | Kuma | H04N 5/783 345/501 |
| 2012/0120409 A1* | 5/2012 | Coffin | 356/496 |
| 2014/0253620 A1* | 9/2014 | Watanabe et al. | 347/11 |
| 2014/0253930 A1* | 9/2014 | Nakajima | 358/1.9 |

* cited by examiner

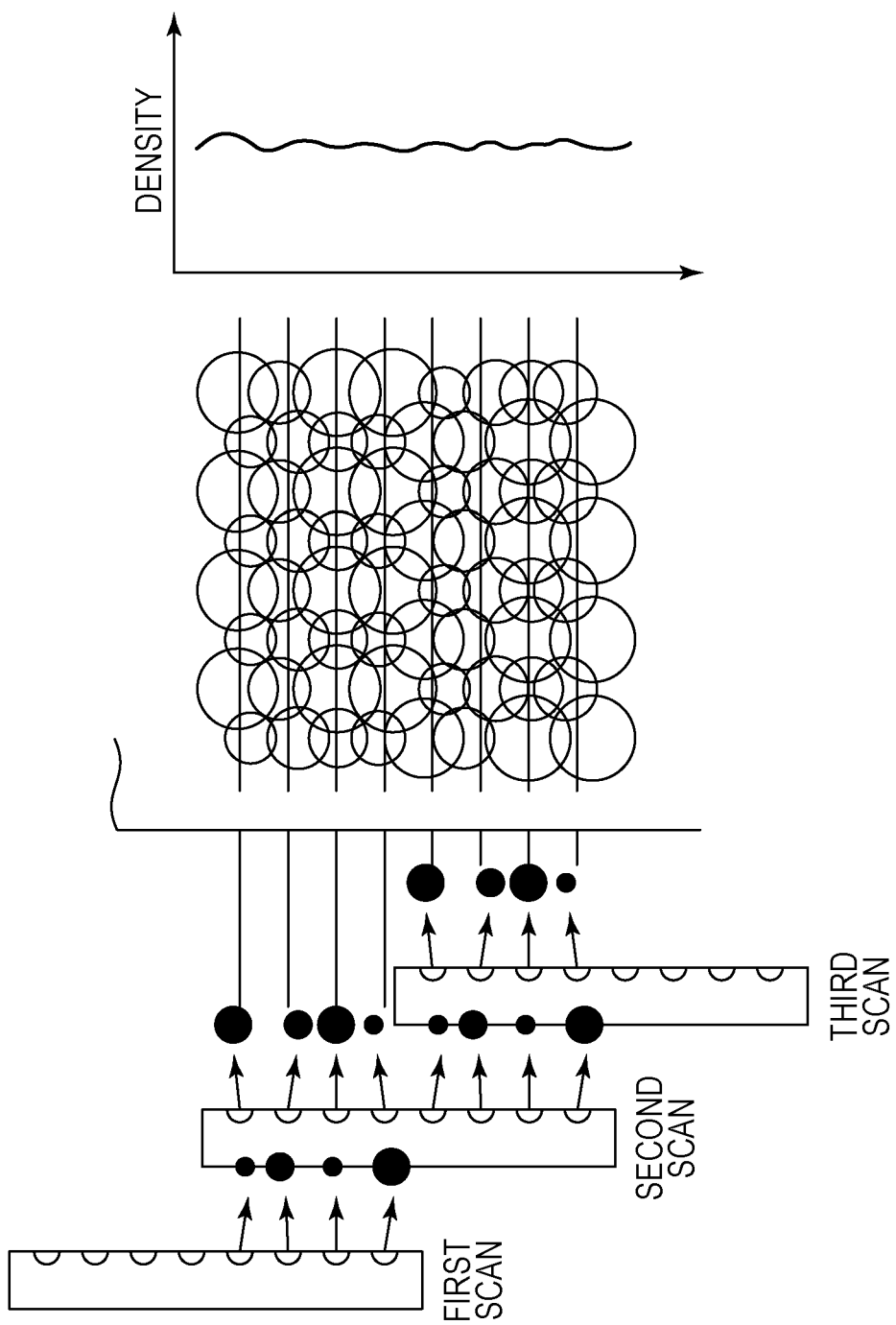

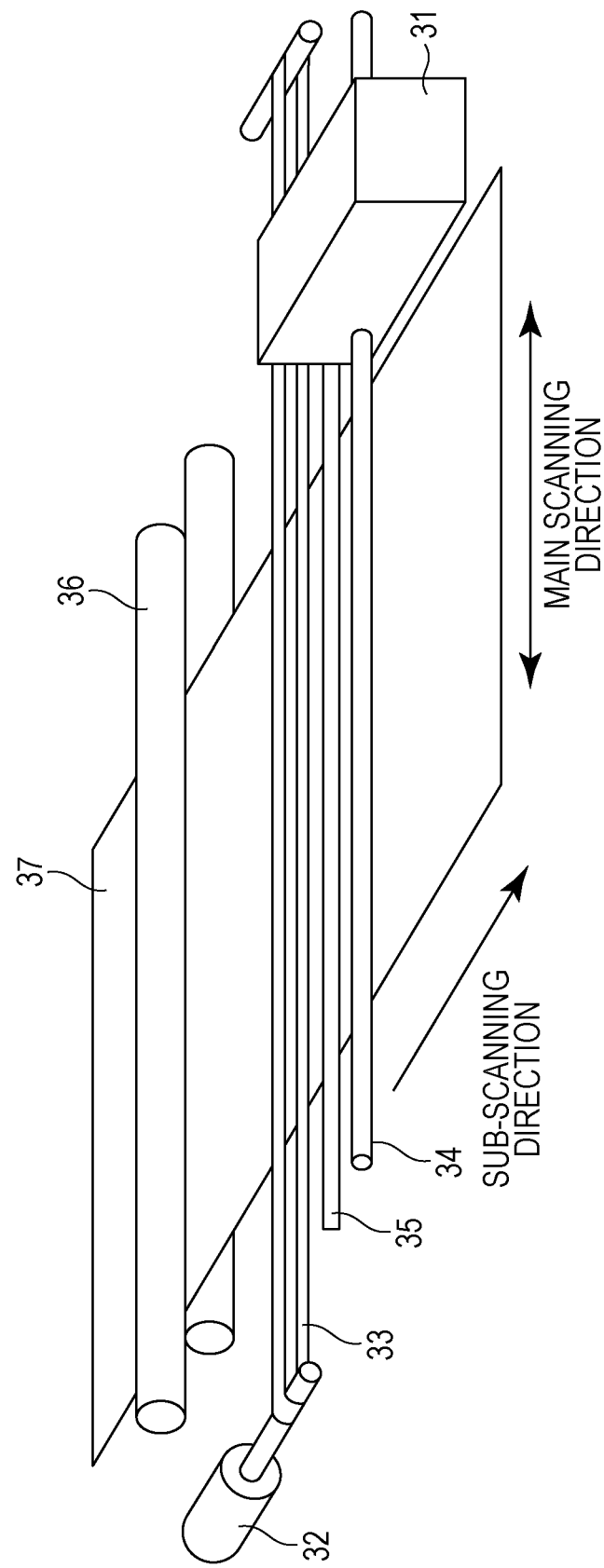

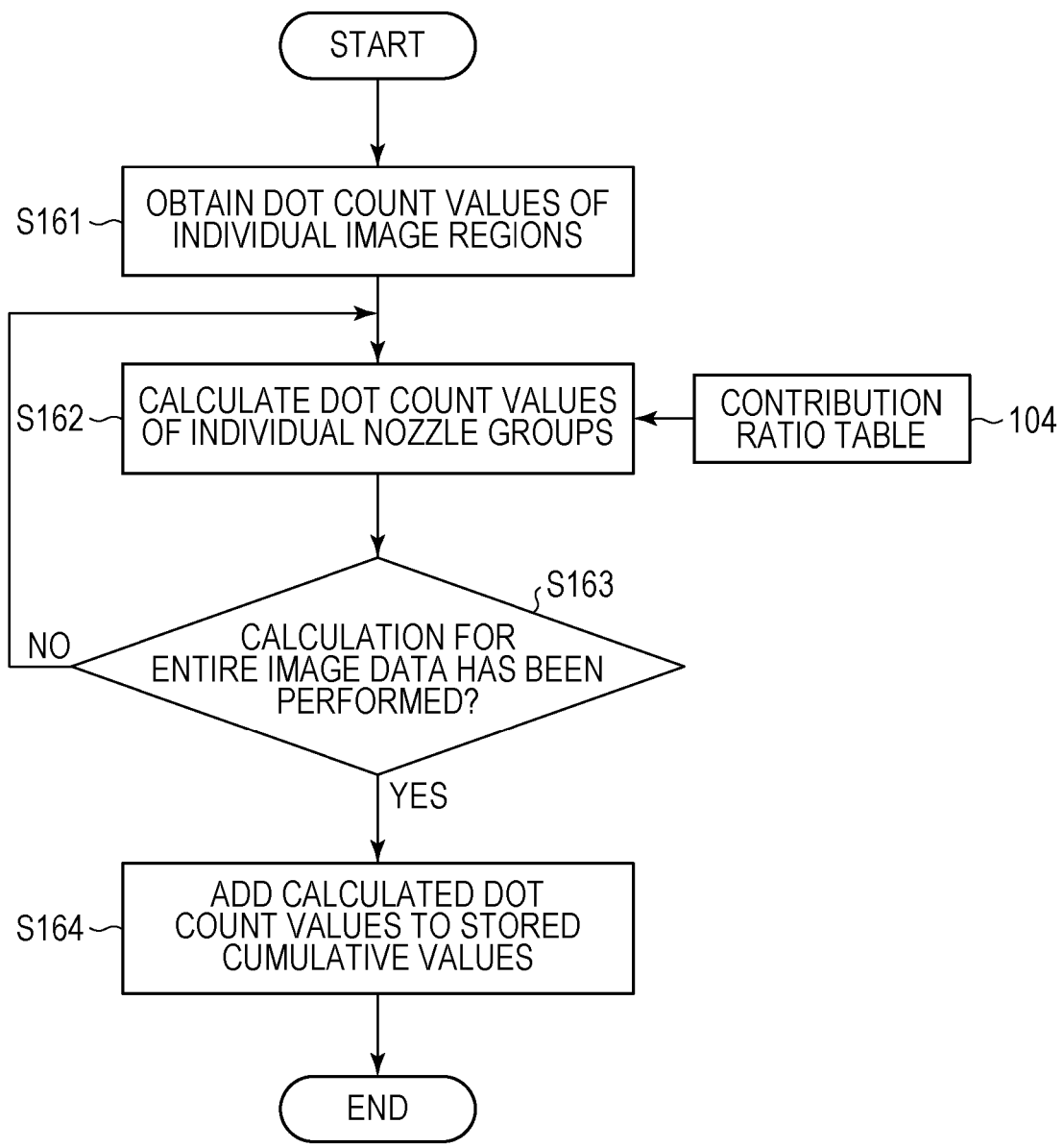

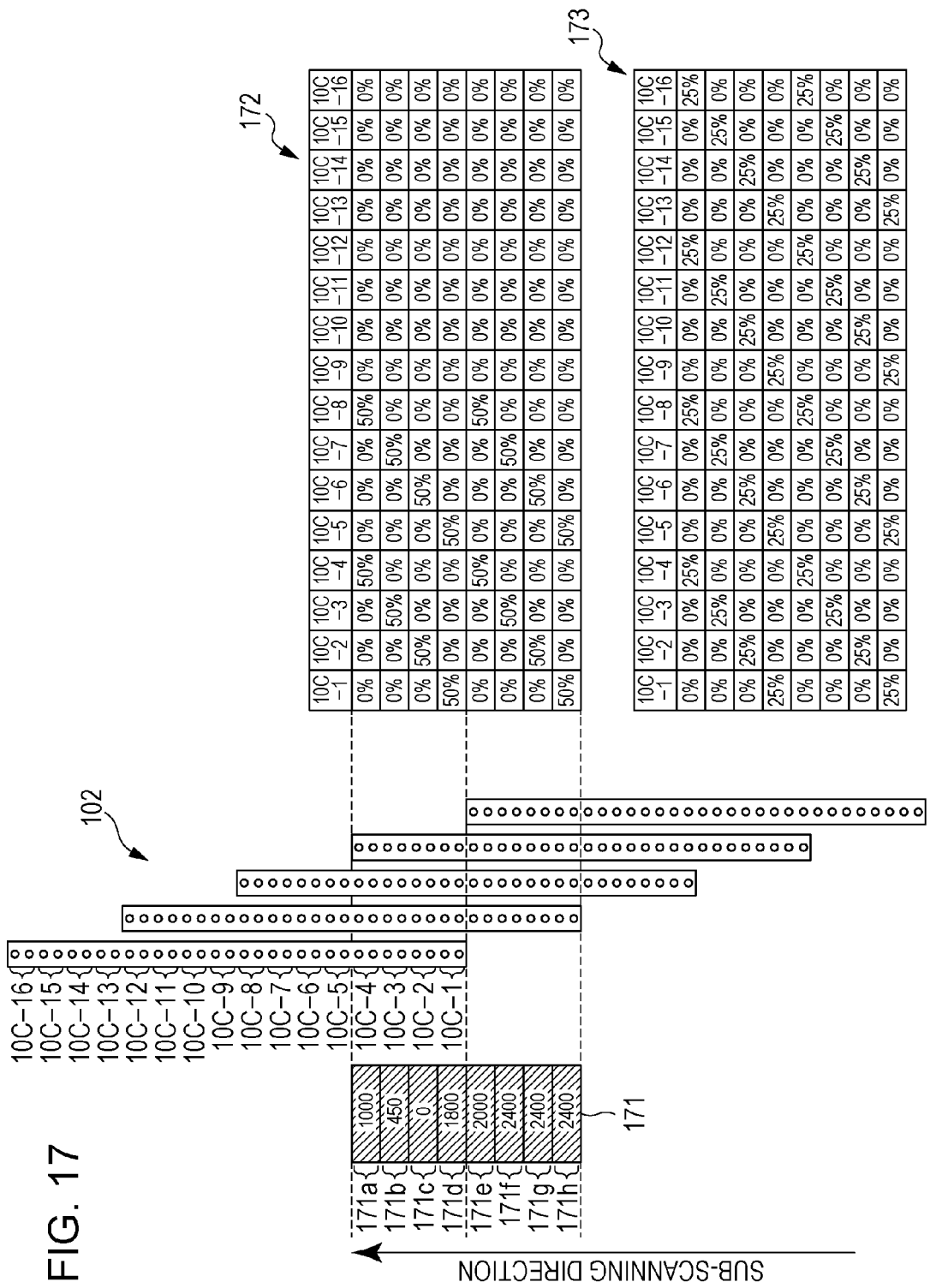

IMAGE PROCESSING APPARATUS, IMAGE PROCESSING METHOD, AND NON-TRANSITORY COMPUTER-READABLE STORAGE MEDIUM

BACKGROUND

1. Field

Aspects of the present invention generally relate to an image processing apparatus, an image processing method, and a non-transitory computer-readable storage medium.

2. Description of the Related Art

Inkjet recording apparatuses are advantageous in being capable of a high-density and high-speed recording operation and adopting a printing scheme that realizes low running cost and a silent operation, and have been commercialized as output apparatuses of various forms. In recent years, inkjet recording apparatuses have been used for printing a photo image of high quality approaching that of a silver halide photo, as well as for printing an office document using plain paper. One of big factors of the increased image quality of inkjet recording is a decrease in granularity of an image, which has been realized by decreasing the size of ink dots and using color materials of a plurality of densities.

One of factors of not being able to obtain a high-quality image through inkjet recording may be density unevenness of an image resulting from variations in ejection characteristics of a recording head. In an inkjet recording apparatus including a plurality of recording elements (nozzles), the ejection characteristics of the individual recording elements vary, and thereby density unevenness may occur in a recorded image. The variations in ejection characteristics of the recording elements are classified into variations in a landing position of ink and variations in an ejection volume, which may result from variations in a heating value of a heater that heats ink, variations in a nozzle aperture, and so forth. Also, the amounts of ink ejected from the individual recording elements may vary due to variations in a heating value of a heater caused by change over time or variations in viscosity of ink caused by a difference in an environment where the apparatus is used.

Head shading correction is available as a method for reducing an influence of variations in ejection characteristics of a recording head. In head shading correction, a test pattern printed by using a recording head is read, and density values of image data corresponding to individual nozzles are corrected so as to reduce density unevenness. Variations in an ejection volume in a recording element array are not always constant, and the ejection volume independently changes in accordance with an ejection history of a recording element. Thus, it is necessary to regularly perform head shading correction in order to maintain an effect of reducing density unevenness.

Japanese Patent Laid-Open No. 2008-87369 describes a technique of frequently performing head shading correction at an initial stage of using a recording head where the recording density is likely to change, and reducing the frequency of head shading correction after the initial stage ends. Specifically, Japanese Patent Laid-Open No. 2008-87369 describes a technique of dividing a region into sub-regions in a nozzle array direction, determining, for each sub-region, whether or not the number of recordings is in the range where the recording density is likely to change at the initial stage of using the recording head, and determining the frequency of head shading correction.

As in the method described in Japanese Patent Laid-Open No. 2008-87369, in the case of calculating the number of recordings in each nozzle group, a method of counting the number of times the recording elements have been actually driven, or a method of counting the number of dots of image data may be used. In this case, if the number of recordings in each nozzle group is counted by using the number of drives in the former method, a large processing load is imposed on a currently available printer system in which nozzles are arranged at high density, which leads to an increase in cost in the entire printer system. On the other hand, in the latter method of counting the number of dots of image data, in the case of recording an image by using a plurality of nozzle groups by performing a plurality of scanning operations as in multipass recording, the total number of dots recorded in all the scanning operations is obtained, but the number dots recorded by each nozzle group is not obtained.

SUMMARY

According to an aspect of the present invention, there is provided an image processing apparatus for recording an image on a unit region of a recording medium by performing a plurality of relative scanning operations of the recording medium and a recording head including a plurality of recording elements arranged in a certain direction. The image processing apparatus includes a storage unit and a determining unit. The storage unit is configured to store, based on image data of the image and ratios of using a plurality of recording element groups for recording the image, each of the plurality of recording element groups including a different recording element, dot count values for the plurality of recording element groups. The determining unit is configured to determine, based on the dot count values, whether density correction data for correcting the image data needs to be generated.

Further features of the present disclosure will become apparent from the following description of exemplary embodiments with reference to the attached drawings.

BRIEF DESCRIPTION OF THE DRAWINGS

FIGS. 2A to 2C are diagrams illustrating density unevenness resulting from an ejection state of a recording head during 2-pass recording.

FIG. 3 is a diagram for describing a schematic configuration of an inkjet recording apparatus.

FIG. 16 is a flowchart illustrating the processing of determining a timing to generate an HS correction one-dimensional LUT according to the third embodiment.

FIG. 17 is a diagram for describing a method for calculating dot count values for individual nozzle groups according to a fourth embodiment.

DESCRIPTION OF THE EMBODIMENTS

First Exemplary Embodiment

Hereinafter, an exemplary embodiment will be described with reference to the drawings.

First, with reference to FIGS. 1A to 2C, a description will be given of multipass recording, in which recording is performed by scanning the same region a plurality of times. This is one of methods for suppressing density unevenness resulting from variations in an ejection volume of a recording head.

Figure 1A:
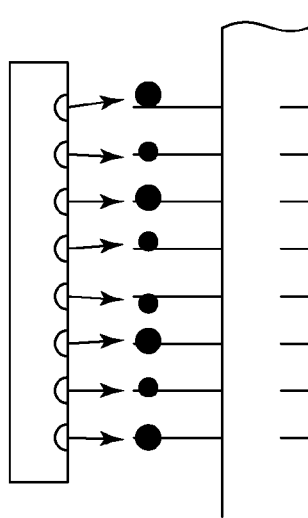
FIGS. 1A to 1C are diagrams illustrating density unevenness resulting from an ejection state of a recording head during 1-pass recording.
Figure 1B:
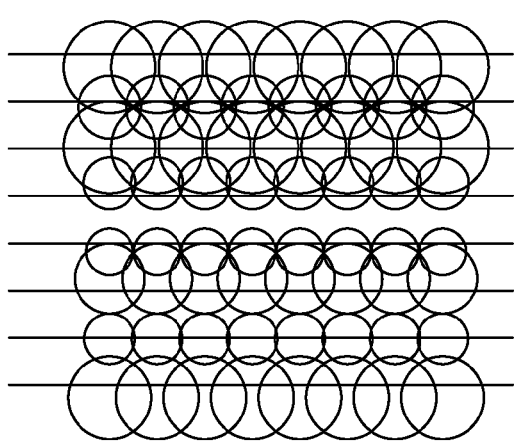
Figure 1C:
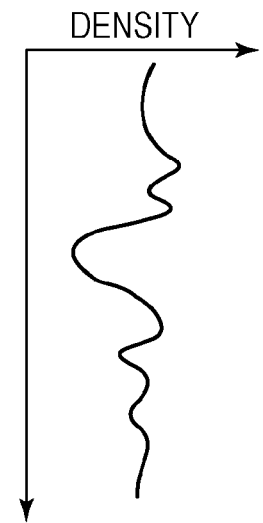

FIGS. 1A to 1C illustrate an example of a case where so-called 1-pass printing is performed. In 1-pass printing, an image is recorded through one scanning operation using a recording head. FIG. 1A illustrates a state where ink drops ejected from eight recording elements provided on the recording head vary in the volume and direction. If 1-pass printing is performed by using such a recording head having variations in ejection characteristics, dots whose sizes and landing positions vary in individual printing rows corresponding to the recording elements are formed in a print region of a recording medium as illustrated in FIG. 1B. The variations in the sizes and landing positions of the dots formed on the recording medium may generate a white portion that is seen at the center of FIG. 1B and a portion where dots overlap more than necessary. FIG. 1C illustrates a density distribution of an image formed of dots illustrated in FIG. 1B. Such variations in image density may be recognized as a white streak or black streak of the image.

FIGS. 2A to 2C are explanatory diagrams illustrating a case where multipass recording is performed by using the recording head illustrated in FIG. 1A. As illustrated in FIG. 2A, the print region illustrated in FIG. 1A is scanned three times by using the recording head, so as to form an image. At this time, in two regions each of which is half the print region and is formed of four vertically-arranged pixels, an image is formed through two scanning operations. In the case where an image is recorded through two scanning operations, the eight recording elements of the recording head are grouped into upper and lower regions, each being formed of four recording elements, and a dot printed by one recording element through one scanning operation is formed by thinning desired image data to half by using a certain method. Then, the recording medium is conveyed a distance corresponding to four pixels, and dots are complementarily formed with the other half of the image data by using recording elements different from those used in the first scanning operation. FIGS. 2B and 2C illustrate the density of the recorded image. As can be seen, density unevenness is reduced compared to the case illustrated in FIGS. 1A to 1C. As described above, in the multipass recording method, one dot line (hereinafter referred to as raster) in the scanning direction of the recording head (main scanning direction) is recorded by using a plurality of different recording elements, and accordingly an influence of variations in ejection characteristics of the individual recording elements can be reduced.

FIG. 3 is a perspective view illustrating the internal configuration of an inkjet recording apparatus according to this embodiment. In accordance with a movement of a timing belt 33 driven by a carriage (CR) motor 32, a carriage 31 having a recording head thereon reciprocates in the main scanning direction of FIG. 3 while being guided and supported by a guide shaft 34. A flexible cable 35 electrically connects a board of the main body of the apparatus and the recording head while following the movement of the carriage 31. A conveying roller pair 36 pinches a recording medium 37 and conveys, in accordance with rotations thereof, the recording medium 37 in a certain direction (sub-scanning direction) that crosses the main scanning direction. A main scanning operation in which the carriage 31 moves in the main scanning direction with the recording head ejecting ink in accordance with recording data, and a conveyance operation performed in accordance with rotations of the conveying roller pair 36 are alternately and repeatedly performed, and thereby an image is formed on the recording medium 37 step by step.

Figure 4:
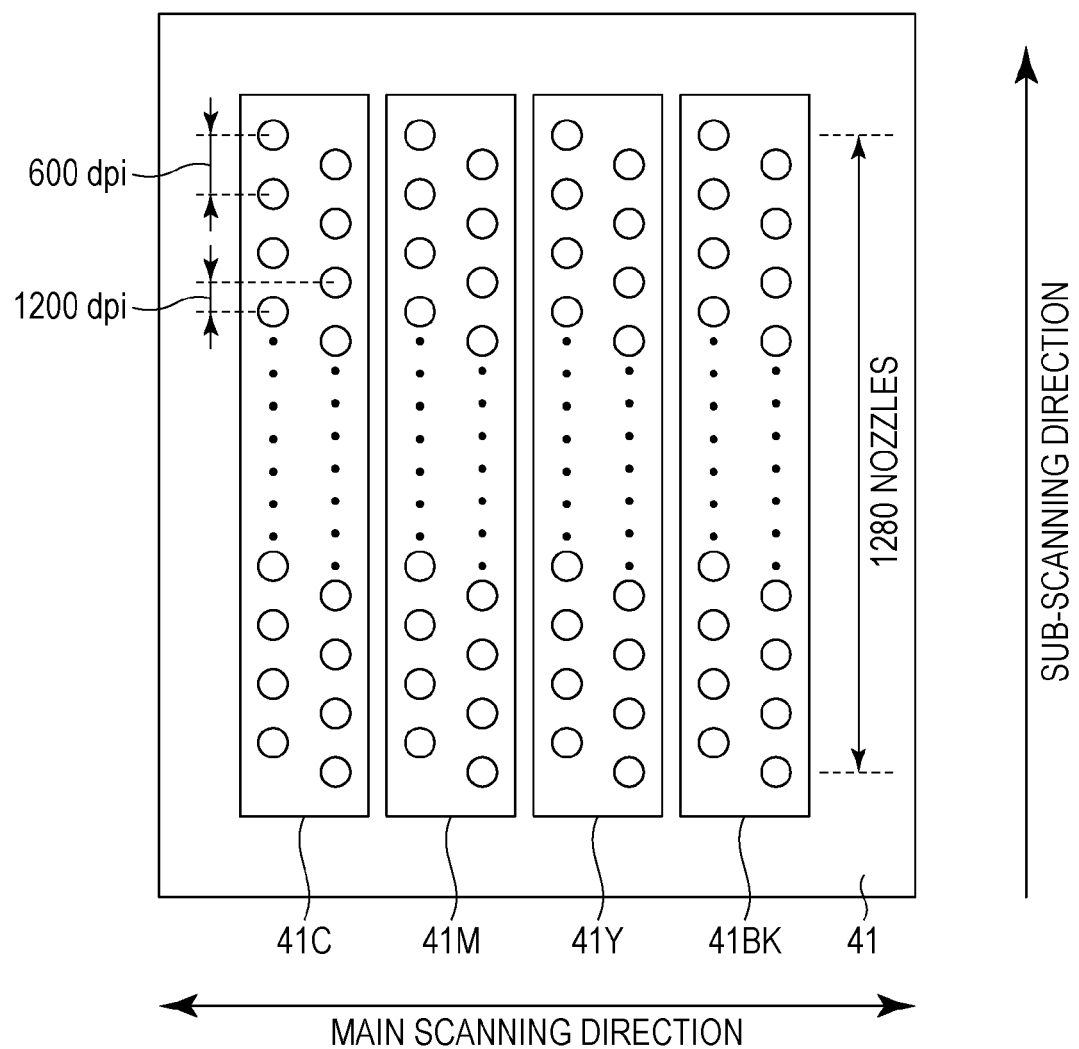
FIG. 4 is a schematic diagram for describing recording elements provided on a recording head.

FIG. 4 is a schematic diagram illustrating the recording element side of a recording head 41 according to this embodiment. The recording head 41 includes, for each ink color, a recording element array in which 1280 recording elements (hereinafter also referred to as nozzles) are arranged in the sub-scanning direction with a density of 1200 dots per inch. A nozzle array 41C that ejects cyan ink, a nozzle array 41M that ejects magenta ink, a nozzle array 41Y that ejects yellow ink, and a nozzle array 41BK that ejects black ink are arranged in the main scanning direction of the recording head 41. Each of the nozzle arrays 41C, 41M, 41Y, and 41BK is formed of two nozzle arrays, in which nozzles are arranged with a density of 600 dots per inch, arranged in a staggered pattern with a shift of $1/1200$ inches. These two arrays are regarded as one nozzle array, and accordingly 1200 dots per inch can be formed on a recording medium. The amount of ink drop (ejection volume) ejected from each nozzle is about 4.5 pl. However, the ejection volume of black ink may be set to be larger than that of the other inks in order to realize high density. The recording head according to this embodiment ejects ink by using heat energy, and includes, in nozzles, an electro-thermal converter for generating heat energy. The method for ejecting ink is not limited to the method of using heat energy, and other methods may be used, such as a method of ejecting ink by using piezoelectric elements.

As a result of ejecting ink while the recording head 41 being scanned in the main scanning direction, dots can be formed with a recording density of 2400 dpi (dots per inch) in the main scanning direction and 1200 dpi in the sub-scanning direction. The recording head 41 that ejects inks of four colors (CMYK) may have units for individual colors that are independent of one another, or may have an integrated structure. Further, light cyan ink and light magenta ink may be added to the above-described four inks in order to increase granularity, or red ink, green ink, and blue ink may be added in order to increase color development.

Example Configuration of Image Processing System

Figure 5:
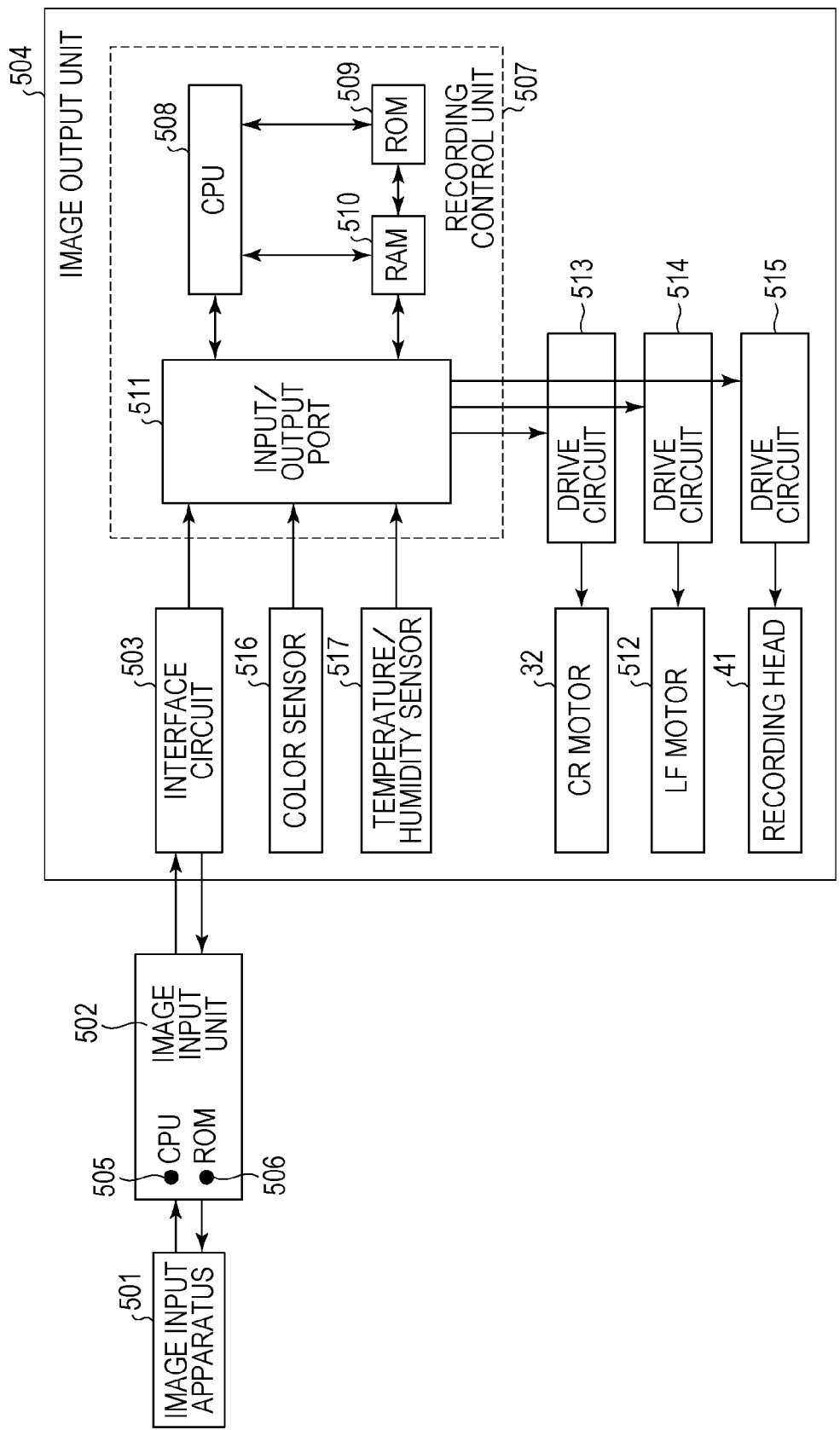
FIG. 5 is a block diagram illustrating the configuration of a control system of the inkjet recording apparatus.

Next, a description will be given of a control configuration for performing recording control of the inkjet recording apparatus. FIG. 5 is a block diagram for describing the configuration of a control system of the inkjet recording apparatus illustrated in FIG. 3. First, multivalued image data stored in an image input apparatus 501 such as a scanner or digital camera or a storage medium such as a hard disk is input to an image input unit 502. The image input unit 502 is a host computer connected to the outside of the inkjet recording apparatus, and transfers image information to be recorded to an image output unit 504 serving as a recording apparatus via an interface circuit 503. The image input unit 502 is provided with a central processing unit (CPU) 505 that is used to transfer image data and a storage device (read only memory (ROM) 506). The host computer may be a computer serving as an information processing apparatus, or may be an image reader or the like.

A recording control unit 507 includes a CPU 508, a storage device (ROM 509) storing a control program or the like, and a random access memory (RAM) 510 serving as a working area for performing various image processing operations. The ROM 509 stores various data, such as a control program for the CPU 508 and a parameter used for a recording operation. The ROM 509 according to this embodiment is an electrically erasable programmable ROM (EEPROM), and the information stored therein can be electrically rewritten. The information is saved even after the power of the recording apparatus has been turned off. The RAM 510 is used as a working area for the CPU 508, and temporarily stores various data, such as image data received from the image input unit 502 and generated recording data. Also, the ROM 509 stores lookup tables (LUTs) 602, 604, and 606 and a contribution ratio table 104, which will be described below with reference to FIG. 6. The RAM 510 stores patch data for recording patches. The LUTs 602, 604, and 606 and the contribution ratio table 104 may be stored in the RAM 510, and the patch data may be stored in the ROM 509.

The recording control unit 507 performs image processing (described below) on the input multivalued image data that has been transferred from the image input unit 502, and thereby converts the image data into binary image data. The recording control unit 507 includes an input/output port 511, which is connected to drive circuits 513, 514, and 515 for the CR motor 32 in the conveying unit, a conveying (LF) motor 512, and the recording head 41. Further, the input/output port 511 is connected to sensors, such as a color sensor 516 that is used for measuring a color patch and detecting a recording medium, and a temperature/humidity sensor 517 for detecting a temperature and humidity of the surrounding environment. On the basis of the binary image data generated through conversion by the recording control unit 507, an image is formed by applying ink onto a recording medium from the individual recording elements of the recording head 41.

In this embodiment, with a relatively simple method that imposes a small load on the printer system, dot count values are calculated in units of nozzle groups which are obtained by dividing a nozzle array by a certain value, by using a dot count value of image data and a contribution ratio described below. With such a dot count value calculation method using a contribution ratio, the timing to generate correction data used for head shading correction can be determined with high accuracy.

Figure 6:
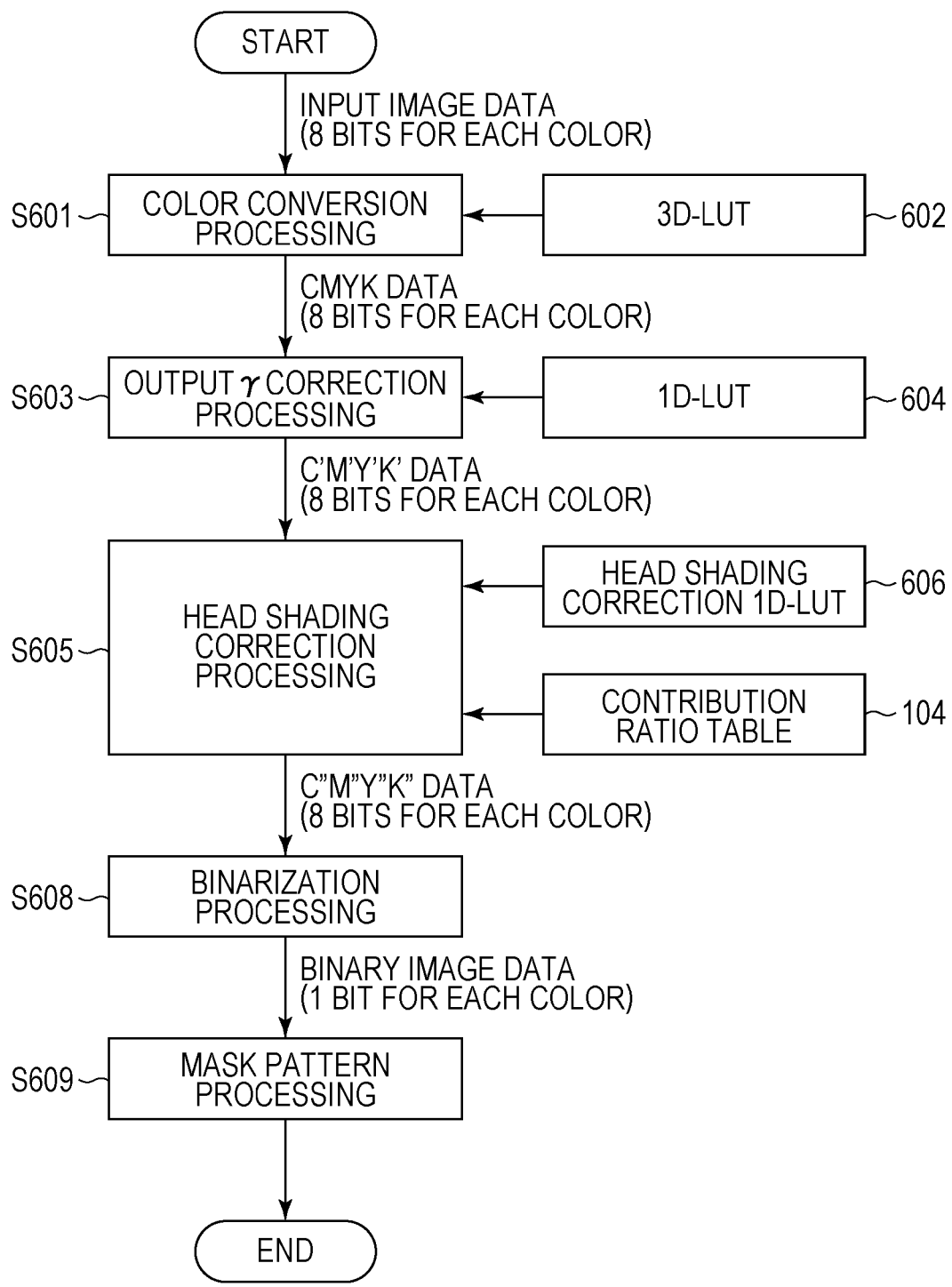
FIG. 6 is a flowchart illustrating the processing performed by a recording control unit.
Figure 11:
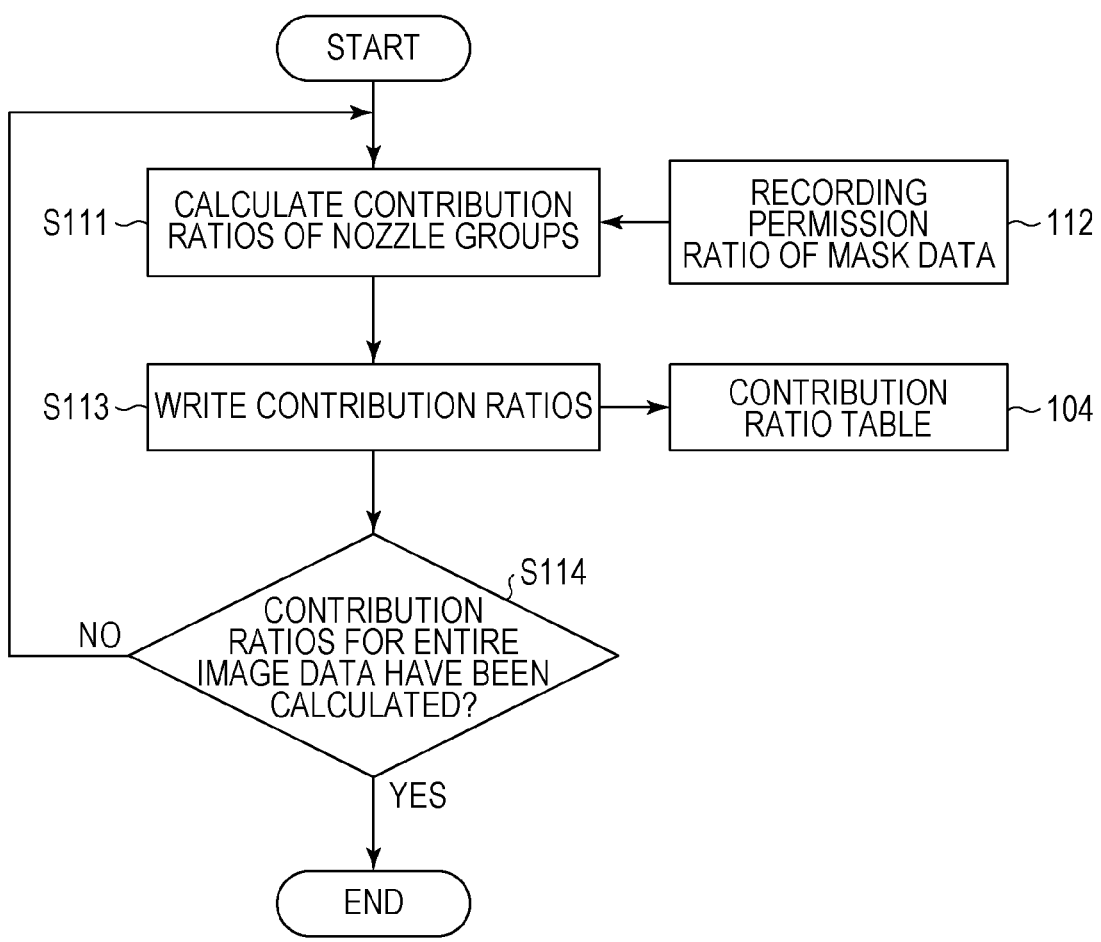
FIG. 11 is a flowchart illustrating the processing of calculating contribution ratios for individual rasters.

FIG. 6 is a flowchart illustrating the processing performed by the recording control unit 507 illustrated in FIG. 5. This flow starts when the recording apparatus receives a print job from a host computer. The print job includes recording condition information indicating recording conditions of a recording mode for recording an image, such as the number of passes in multipass recording, an amount of margin or an amount of portion that lies off the edge, the magnification of an image, and so forth, in addition to image data of the image to be recorded. The recording control unit 507 functions as a control unit capable of performing the above-described characteristic processing on the basis of the image data and the recording condition information. The recording control unit 507 functioning as a control unit determines the nozzles to be used for individual pixels of the image data. Although the details will be described below, in response to receipt of a print job, the processing illustrated in FIG. 11 is performed in parallel with the processing illustrated in FIG. 6, and a contribution ratio table to be used in head shading correction processing in step S605 in FIG. 6 is generated. The contribution ratio table may be generated after a print job has been received until step S605 is executed, and the timing of the processing is not limited.

Upon a print job being received by the recording apparatus, color conversion processing is performed in step S601. In the color conversion processing, input image data in which each color is constituted by 8 bits is converted to density signals of C, M, Y, and K. Specifically, with reference to the three-dimensional color conversion LUT 602, the input image data is converted, on a pixel by pixel basis, to multilevel gradation data (CMYK data) of a plurality of ink colors available by a printer.

The number of dimensions of the color conversion LUT 602 indicates the number of components (elements) of the input image data that is subjected to the color conversion processing in step S601. However, the color conversion LUT 602 holds only density signals for specific and discrete RGB signals, and does not support all the combinations of RGB expressed in 256 levels for each color. Thus, interpolation processing is performed for the RGB signals in a region that is not supported, by using a plurality of pieces of data held therein. Here, an interpolation processing method according to the related art is used, and thus the detailed description is omitted. The value of the multilevel gradation data (CMYK data) obtained through the color conversion processing in step S601 is expressed by 8 bits, like the input image data as an input value, and is output as a density value having a gradation value of 256 levels.

In step S603, output γ correction processing is performed, in which CMYK data that has undergone color conversion is corrected. Here, the data is corrected for each ink color with reference to the 1D-LUT 604, which is a one-dimensional correction table, so as to maintain linearity for a density signal representing the optical density that is eventually expressed on a recording medium. The 1D-LUT 604 is generated on the basis of a recording head having a standard recording characteristic. The C'M'Y'K' data output here has a density value of 8 bits like the input image data.

In step S605, density correction processing (head shading correction processing) is performed on the density value of 8 bits by using the HS correction one-dimensional LUT 606 and the contribution ratio table 104, and thereby C"M"Y"K" data is generated. In the above-described output λ correction processing in step S603, a 1D-LUT created for a standard recording head is used, and thus individual variations in recording heads or variations in recording characteristics of individual nozzles may occur. Thus, in step S605, head shading correction (hereinafter referred to as HS correction) is performed, in which variations in recording characteristics are corrected in units of nozzles.

In step S608, binarization processing is performed, in which the data is converted to 1-bit binary image data defining the recording positions of dots recordable by the recording head 41. A typical multivalued error diffusion processing is adoptable as the binarization processing. In step S609, a mask pattern to be used in mask pattern processing (described below) is selected on the basis of the binary image data, and output image data for each scanning operation is generated.

An optimal conversion method in the color conversion processing in step S601, the output λ correction processing in step S603, the head shading correction processing in step S605, and the binarization processing in step S608 varies according to the type of recording medium and the type of image to be recorded. In particular, the three-dimensional color conversion lookup table (3D-LUT) 602 used in color conversion processing is prepared for each type of recording medium.

Figure 7:
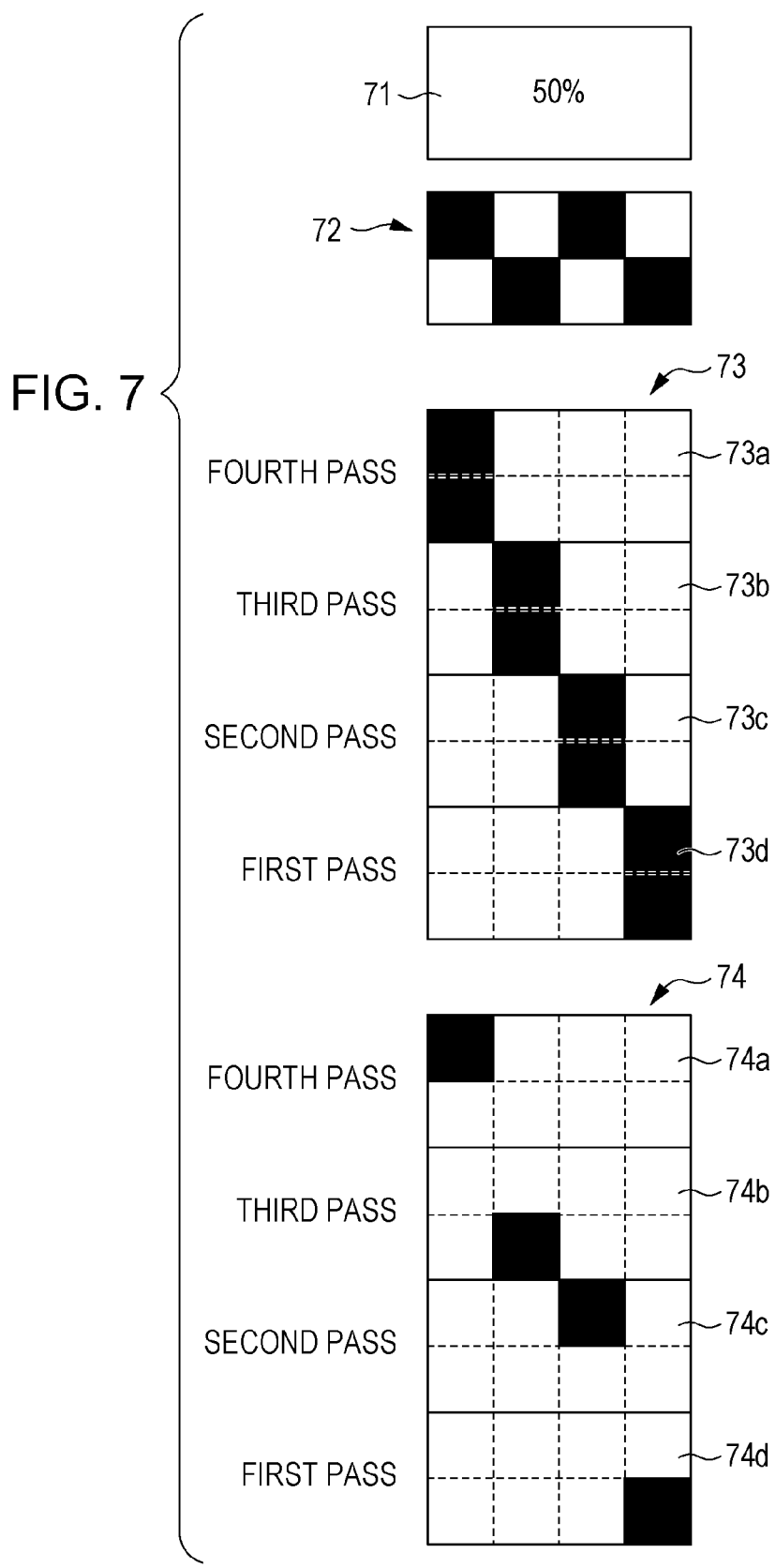
FIG. 7 is a diagram for describing mask pattern processing.

With reference to FIG. 7, a detailed description will be given of the mask pattern processing in step S609. A mask pattern is stored in the ROM 509 in the recording control unit 507. In the mask pattern processing in step S609, image data of individual colors is divided into recording scanning regions by using the mask pattern, and thereby pieces of dot data for the individual recording scanning regions and individual ink colors are generated.

Image data 71 represents the recording density of unit pixels in a recording image, which is 50%. Binarization processing is performed on the image pixels of the recording density of 50%, and resolution conversion is performed thereon simultaneously. Accordingly, binary image data 72 having 4×2 recording pixels is obtained. The binary image data 72 has four black pixels representing recording of dots, and four white pixels representing non-recording of dots, that is, the recording density thereof is 50%. In this embodiment, a recording density represents the percentage of pixels on which dots are actually recorded among pixels on a recording medium arranged in 1200 dpi×1200 dpi. That is, a recording density of 50% corresponds to a state where dots are recorded on half of all the pixels.

In FIG. 7, reference numeral 73 denotes an example of a mask pattern used for 4-pass multipass recording in which an image is recorded through four recording scanning operations. This mask pattern is constituted by a plurality of pixel regions, each indicating whether or not recording of a dot is permitted. A black region is a recording permitted pixel for which recording of a dot is permitted, whereas a white region is a recording non-permitted pixel for which recording of a dot is not permitted. Individual mask patterns 73a to 73d have a uniform recording permission ratio of 25%, and complement one another to achieve a total recording permission ratio of 100%.

Nozzles in a nozzle array are grouped into four regions in the vertical direction. The nozzles included in the individual regions record dots in accordance with the mask patterns 73a to 73d corresponding to the individual regions of the mask pattern 73 and image data. In each scanning operation, the logical AND of the mask patterns 73a to 73d and the binary image data 72 obtained through binarization processing is calculated, and thereby the pixels on which recording is actually performed in individual scanning operations are determined. Reference numeral 74 denotes a result of the logical AND, in which the positions of pixels on which recording is performed in individual recording scanning operations are arranged in the vertical direction. As can be seen, recording is performed on one pixel in each recording scanning operation. For example, output image data 74b recorded in the second recording scanning operation is led from the logical AND of the binary image data 72 and the mask pattern 73b. That is, a dot is recorded only in a case where there is pixel data recorded in binary image data and recording is permitted in the mask pattern. Here, a mask pattern having a region of 4 pixels×8 pixels is illustrated to simplify the description, but the mask pattern has a larger region in both the main scanning direction and the sub-scanning direction. In particular, it is general that the number of nozzles in a nozzle array of the recording head is the same as the number of pixels in the mask pattern in the sub-scanning direction.

Method for Generating Head Shading Correction LUT

Next, a description will be given of a method for generating the HS correction one-dimensional LUT 606 with reference to FIG. 8. Here, a measurement result of a patch is obtained for each nozzle group of the recording head 41, and a density value of each nozzle group of the recording head 41 is obtained. In this embodiment, head shading correction processing (step S605) is performed after output λ processing (step S603) and before binarization processing (step S608).

Figure 8:
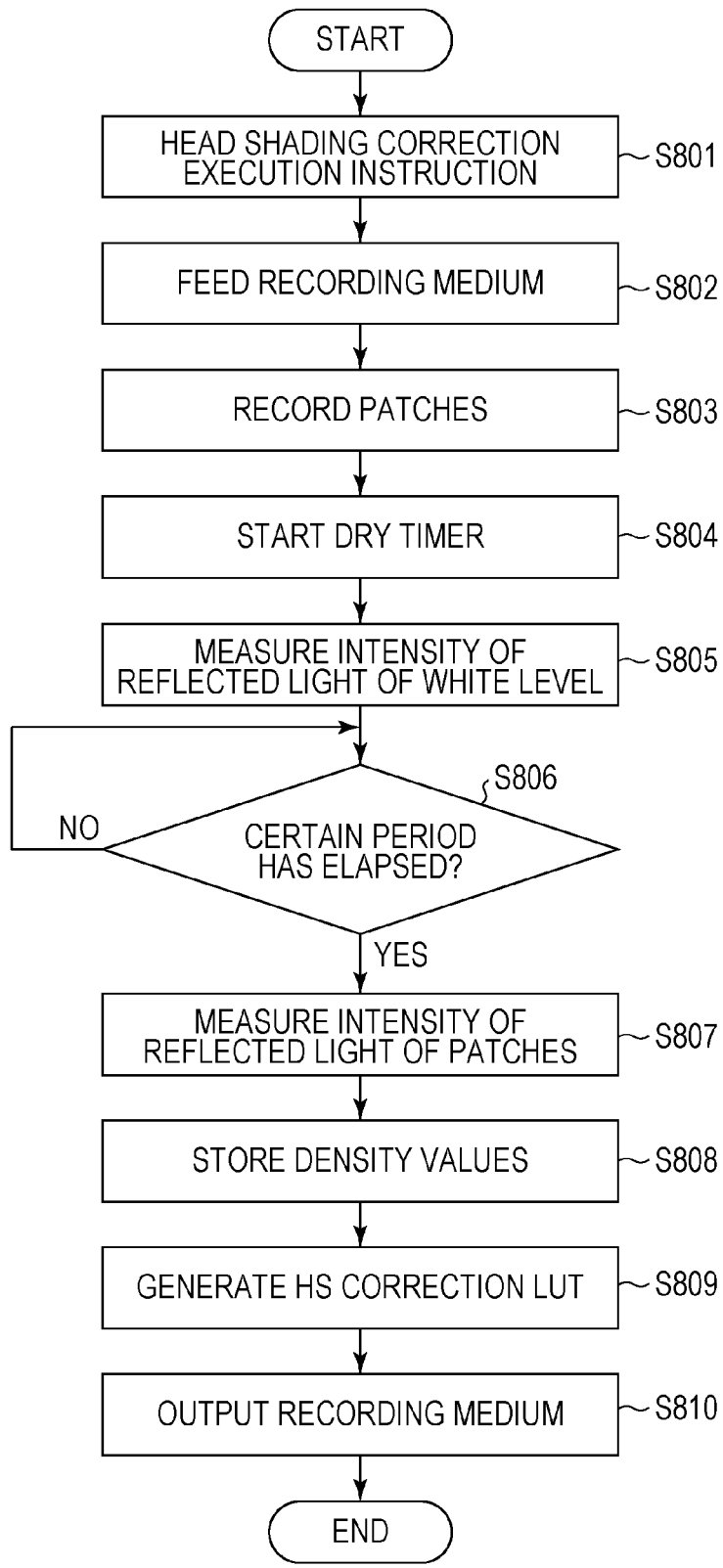
FIG. 8 is a flowchart illustrating head shading correction processing.

FIG. 8 is a flowchart illustrating the processing of obtaining a measurement result of a patch for each nozzle group of the recording head 41 and generating a HS correction one-dimensional LUT, which is necessary to perform head shading correction. First, in step S801, a head shading correction execution instruction for recording a patch and measuring the density is input from the CPU 505 of the image input unit 502 or an operation panel (not illustrated) of the image output unit 504. In response to the input of the head shading correction execution instruction, the image output unit 504 feeds, from a paper feed tray, a recording medium on which a test pattern is to be recorded in step S802. After the recording medium has been conveyed to a region where recording by the recording head 41 is possible, a conveyance operation of the recording medium in the sub-scanning direction and recording scanning in the main scanning direction of the carriage 31 driven by the carriage motor 32 are alternately performed in step S803. Subsequently, the recording head 41 serving as a patch recording unit records a test pattern including patches that are necessary to obtain the density values of individual regions of the recording head 41 on the recording medium.

Figure 9:
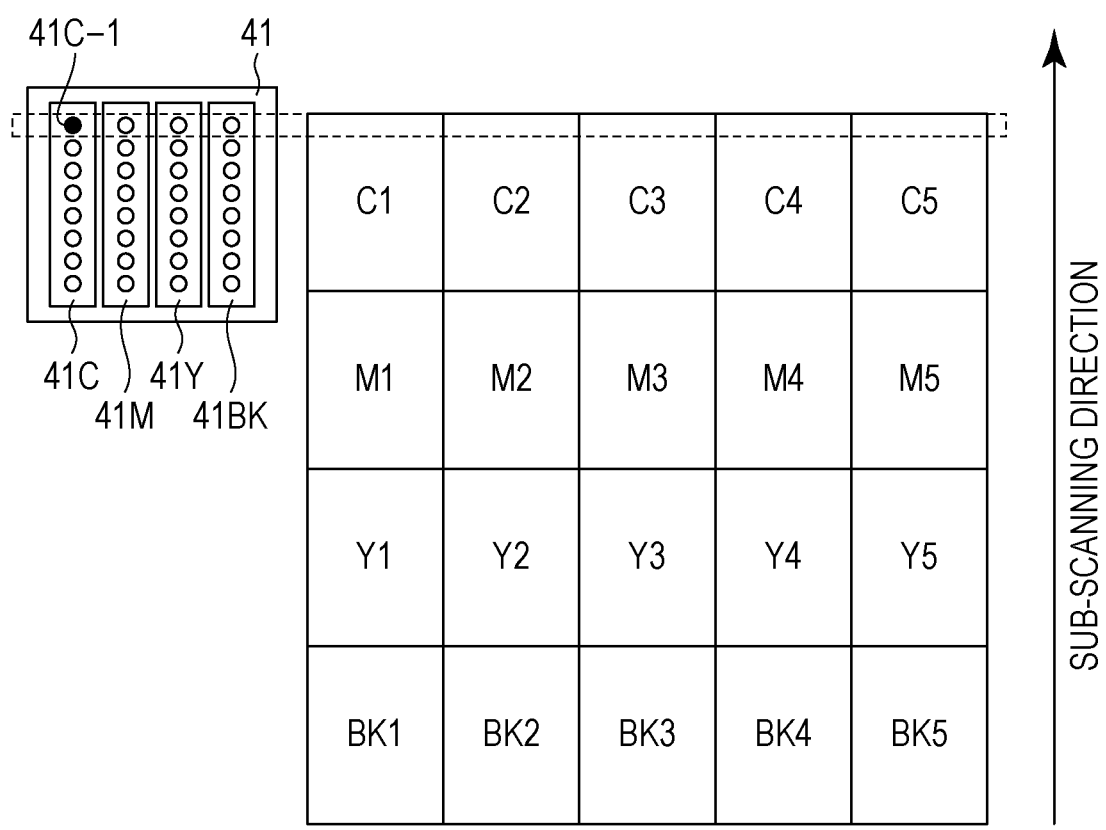
FIG. 9 illustrates an example of patches used for head shading correction.

FIG. 9 is a schematic diagram of the test pattern that is recorded in step S803. In FIG. 9, alphabetic characters and numbers are used to distinguish individual patches from one another, but the patches actually have a uniform density and correspond to individual ink colors. In FIG. 9, the alphabetic characters C, M, Y, and BK assigned to the individual patches are reference symbols indicating the patches recorded by using the inks ejected from the nozzle arrays 41C, 41M, 41Y, and 41BK illustrated in FIG. 4. The numbers 1 to 5 next to the alphabetic characters indicate the ranks of density gradation of color patches to be recorded. Here, the density increases as the number increases. For example, a patch C1 is a patch that has been recorded by the nozzle array 41C which ejects cyan ink and that has a density gradation 1. The number of levels of gradation is not limited to 5. Further, the number does not necessarily correspond to the level of gradation, and the density may increase as the number decreases.

The length in the sub-scanning direction of each patch corresponds to a width over which recording can be performed with the recording head, that is, a nozzle width. In each patch, image data on the N-th row from the downstream side of conveyance of a recording medium in the sub-scanning direction (upper side of the figure) is recorded by using the N-th nozzle from the top in the recording head 41. For example, the first row on the downstream side in the sub-scanning direction of recorded patches (the first row from the top) is recorded by using the nozzle on the first row from the downstream side in the sub-scanning direction of the nozzle array of the recording head (the first nozzle from the top). Also, the second row from the downstream side in the sub-scanning direction (the second row from the top) is recorded by using the nozzle on the second row from the downstream side in the sub-scanning direction (the second nozzle from the top). On the basis of a measurement result obtained by measuring the output patches, the density characteristics of the individual nozzle groups can be obtained.

Referring back to FIG. 8, in step S804, a timer counter for drying the recorded patches for a certain period is started. Subsequently, in step S805, the intensity of reflected light of a white level (the original color of the recording medium) where no patch is recorded is measured by using the color sensor 516. The measurement result of the white level is used as a reference value for calculating the density value of a patch that is recorded thereafter. The measurement result is held for each light-emitting diode (LED) serving as a light source of the color sensor 516. As the density of a blank space of the recording medium where no patch is recorded, the original color of the recording medium is measured. If the recording medium is white, the original color thereof is white. In this embodiment, a description will be given of an example in which a white recording medium is used.

If it is determined in step S806 that the certain period has elapsed in the counter of the dry timer, the intensity of reflected light of each patch is measured in step S807. The measurement of the intensity of reflected light is performed by turning on an LED appropriate for the ink color for which the density is to be measured among the LEDs mounted on the color sensor 516 and reading reflected light of the patch. For example, a green LED is turned on to measure a patch recorded by using M ink and a blank portion (white) where no patch is recorded. A blue LED is turned on to measure a patch recorded by using Y ink and K ink and a blank portion (white) where no patch is recorded. A red LED is turned on to measure a patch recorded by using C ink and a blank portion (white) where no patch is recorded. Measurement of the intensity of reflected light of each patch is performed sequentially or in units of the pitches of nozzles in the sub-scanning direction. Measurement of the intensity of reflected light may be performed for each nozzle, or a plurality of nozzles. In this embodiment, measurement is performed in units of two nozzles.

After reading of patches has been finished, the density values of the patches are calculated for the corresponding nozzle groups on the basis of the output values of the patches and the blank portion (white) in step S808. At the time of measuring a patch, density values for two nozzles may be collectively read. Alternatively, a density value for one nozzle may be read at two positions, and the density values at the two positions may be averaged. The read density values of individual nozzle groups are stored in the ROM 509 or the RAM 510 of the recording control unit 507.

In step S809, the HS correction one-dimensional LUT 606, which is used for head shading correction processing, is generated on the basis of the measured density values of individual nozzle groups. The HS correction one-dimensional LUT 606 is density correction data indicating the correspondence between uncorrected density values of individual nozzles and density values that have been corrected to target values, and is independently generated for each nozzle group. The target value is a certain target density that is determined in advance. The density value of image data is corrected for each nozzle group so that the density value (measured value) of a recorded patch becomes closer to the target value. A patch may be recorded in advance by using an inkjet recording apparatus and a recording head having a high accuracy, and a value obtained by measuring the density thereof may be used as a target value. With use of the generated HS correction one-dimensional LUT 606 and contribution ratios described below, corrected density values of image data are determined in units of rasters on the basis of uncorrected density values of image data.

The HS correction one-dimensional LUT 606 is generated by the CPU 508 of the recording control unit 507 or the CPU 505 of the image input unit 502. The HS correction one-dimensional LUT 606 may be generated for each type of recording medium or each resolution. The generated HS correction one-dimensional LUT 606 is stored in the ROM 509 of the recording control unit 507.

The HS correction one-dimensional LUT 606 may be generated for each usage environment, or may be generated every time image processing is performed to record an image, instead of generating and storing it at the time of performing correction. Alternatively, a table generated in advance may be selected on the basis of patches recorded by a patch recording unit.

Subsequently, the recording medium is output in step S810, and the processing ends. In this way, the content of the HS correction one-dimensional LUT 606 can be updated every time the above-described processing is performed.

Method for Generating Contribution Ratios

Figure 10:
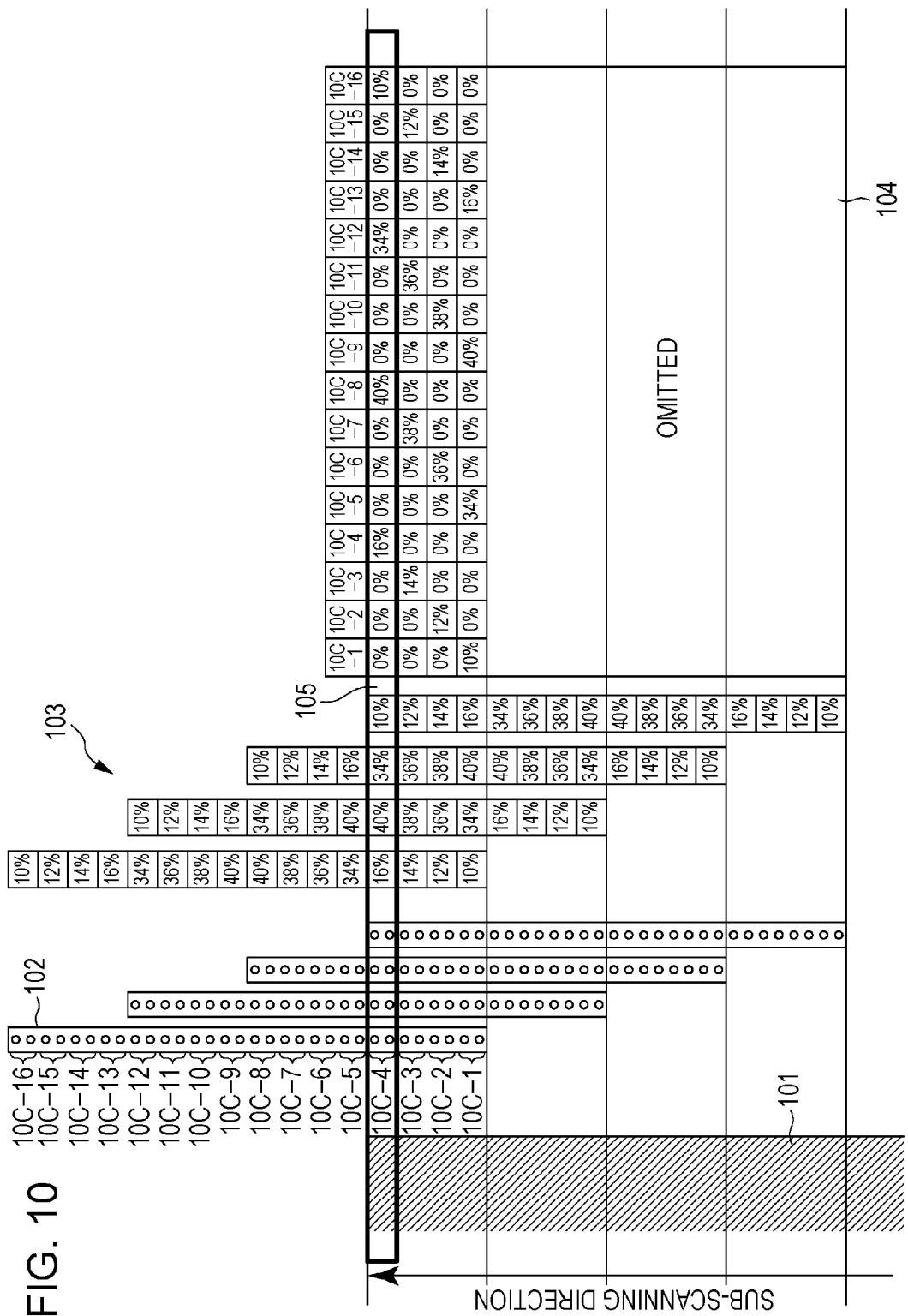
FIG. 10 is a diagram for describing the correspondence between image data and contribution ratios in multipass recording.

Next, a description will be given of contribution ratios used for head shading correction with reference to FIG. 10. Reference numeral 101 denotes image data that is recorded on a recording medium. Reference numeral 102 denotes a movement of a recording head at the time of 4-pass recording. In FIG. 10, only the nozzle array 41C for cyan ink of the recording head 102 is illustrated. Here, each nozzle array includes 32 nozzles to simplify the description. FIG. 10 illustrates a positional relationship in a case where a recording medium is conveyed a distance corresponding to 8 nozzles in the sub-scanning direction every time one recording scanning operation is finished, and the lateral lines represent the boundaries of recording scanning operations. As indicated by an arrow, the upper side of the figure is the direction in which the recording medium is output (sub-scanning direction). The 32 nozzles of the recording head 102 are grouped into 16 groups, each group including 2 nozzles, and the numbers 10C-1 to 10C-16 are assigned to the individual nozzle groups. Reference numeral 103 denotes the recording permission ratios of the mask pattern corresponding to the individual nozzle groups, each including 2 nozzles. The total sum of the recording permission ratios of four regions that complement one another is 100%. Normally, the positional relationship between the nozzles of the recording head 102 and the mask pattern is fixed. Thus, if the recording medium is conveyed in the sub-scanning direction and the positional relationship between the image data 101 and the recording head 102 is changed during the scanning operations of 4-pass recording, the positional relationship between the image data 101 and the mask pattern is also changed.

A contribution ratio is a usage ratio of a nozzle that is used for recording image data in individual image regions. Thus, the contribution ratio is changed according to the positional relationship between the image data and the recording head (mask pattern). For example, in a case where the contribution ratio is 100%, the corresponding image data is recorded only by using the nozzle groups whose contribution ratio is 100%.

With reference to the flowchart illustrated in FIG. 11, a description will be given of a method for generating a contribution ratio table for each image region. As described above, this flow is started when the recording apparatus receives a print job and image data is supplied from the image input unit 502 to the image output unit 504. In step S111, the positional relationship between a recording permission ratio 112 of mask data and image data is determined on the basis of recording condition information representing recording conditions included in the print job. On the basis of the determined positional relationship, the contribution ratios of nozzle groups used for recording of a certain number of rasters are calculated. Subsequently, in step S113, the calculated contribution ratios are written into the contribution ratio table 104. In step S114, it is determined whether or not calculation of contribution ratios for the entire image data has been finished. If calculation has been finished, the processing ends. Otherwise, the processing returns to step S111, and the contribution ratios of the next certain number of rasters are calculated.

With use of the generated contribution ratio table, head shading processing in step S605 in FIG. 6 is performed, and then an operation of recording on a recording medium is started. The processing from step S605 may be performed in order from the region for which a contribution ratio table has been generated. In a case where a recording operation is started before the contribution ratio tables corresponding to all the image regions have been generated, the time lag between when a print job is transmitted to the recording apparatus to when a printing operation starts can be shortened. The contribution ratio table 104 is written on the ROM 509 of the recording control unit 507. Alternatively, the contribution ratio table 104 may be written on the RAM 510 or the ROM 506 of the image input unit 502. Alternatively, the contribution ratio table 104 may be stored in advance, and may be selected in accordance with a pass mask to be used.

Referring back to FIG. 10, the contribution ratio table 104 will be described. The contribution ratio table 104 is a table in which the ratios of using individual nozzle groups from the nozzle group 10C-1 to the nozzle group 10C-16 are determined for each raster of image data. For example, for an image region 105 in the image data, an image is recorded by using four nozzle groups: the nozzle group 10C-4, the nozzle group 10C-8, the nozzle group 10C-12, and the nozzle group 10C-16. Thus, in the contribution ratio table 104, the contribution ratios for the positions corresponding to the above-described four groups are larger than 0, and the contribution ratios of nozzle groups that are not used are 0. The contribution ratio table 104 is determined in accordance with the positional relationship between image data and a nozzle array of the recording head. The number of elements in the sub-scanning direction of the contribution ratio table 104 is the same as the size in the sub-scanning direction of the image data. As a recording permission ratio of a mask pattern used to calculate the contribution ratios of individual nozzle groups, the number of recording permitted pixels in the mask pattern may be counted. In this embodiment, a recording permission ratio table corresponding to the size of a nozzle group is stored in advance as a table corresponding to the mask pattern.

Head shading correction may be performed in units of one or more nozzle groups. However, an effect is obtained also in the case of performing correction in units of a plurality of rasters, and thus the unit of correction may be determined from the viewpoint of processing speed and correction effect. In this embodiment, image data is corrected in units of two nozzles (two rasters).

Head Shading Correction

Figure 12B:
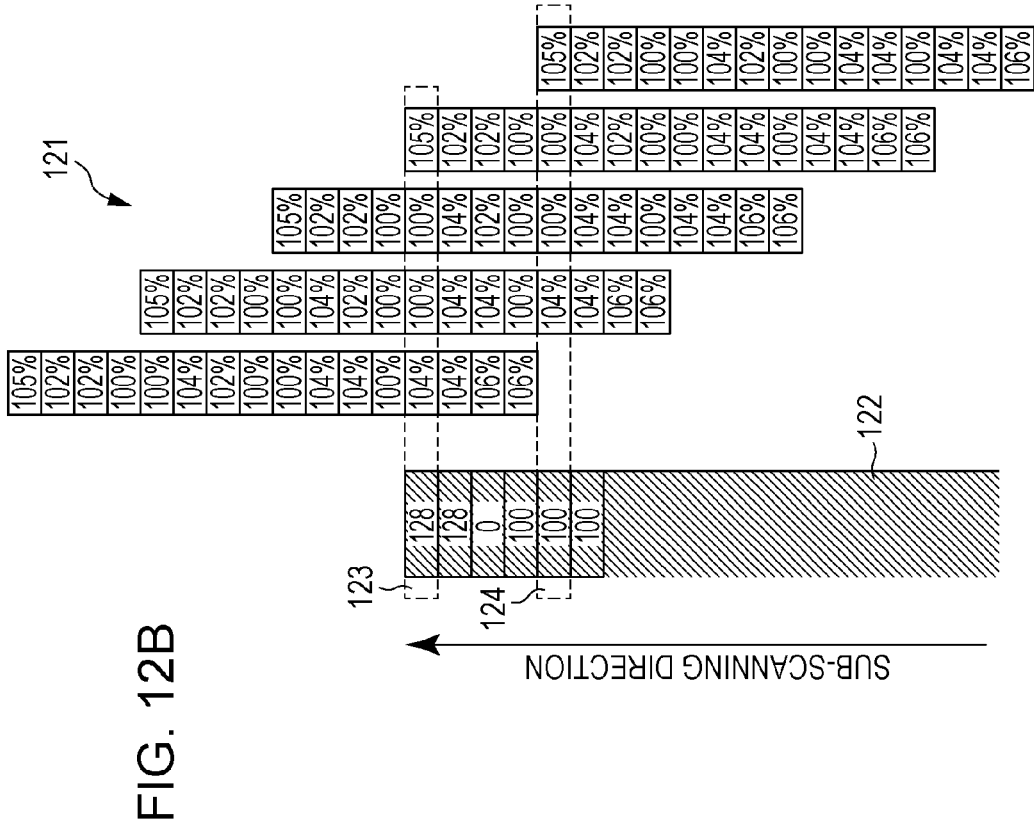
FIGS. 12A and 12B are diagrams for describing density ratios.
Figure 12A:
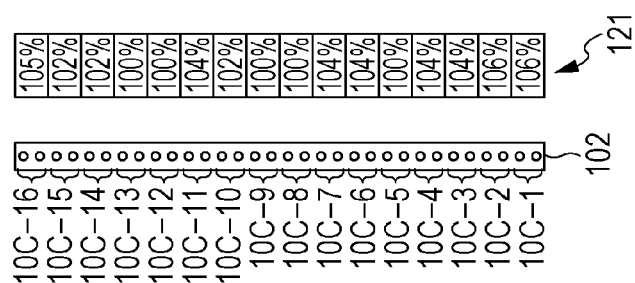

With reference to FIGS. 12A and 12B, head shading correction processing will be described. In this embodiment, the density of image data is corrected by using the HS correction one-dimensional LUT 606 generated for each nozzle group on the basis of the density value of each nozzle group, and the contribution ratio table 104. The product of a contribution ratio, which is information representing the ratio of each nozzle group used to perform recording in each unit region of the image data, and the density ratio of the nozzle group is obtained, and the sum of all the nozzle groups used for recording in the unit region serves as an output value.

FIG. 12A is a diagram illustrating the correspondence between density ratios 121 of the recording head 102 and the nozzle groups 10C-1 to 10C-16. Hereinafter, a method for calculating the density ratios 121 will be described. The HS correction one-dimensional LUT 606, which is calculated on the basis of the density values of individual nozzle groups by performing the above-described processing illustrated in FIG. 8, is used. With use of the uncorrected density value of image data and the HS correction one-dimensional LUT 606, the corrected density values of individual nozzle groups are calculated. The density ratio 121 is obtained by dividing a corrected density value by an uncorrected density value. As the density ratio 121 increases, the uncorrected density value becomes smaller than a target value.

FIG. 12B illustrates the correspondence between image data 122 and the density ratios 121 of the individual nozzle groups of the recording head 102 in the case of performing 4-pass recording. The image data 122 is cyan image data that is recorded by using a nozzle array for cyan ink, and the values written in individual image regions are 8-bit density values. For example, the density value of image data to be recorded in an image region 123 is 128. The contribution ratios of individual nozzle groups in the image region 123 are as follows: 16% for the nozzle group 10C-4, 40% for the nozzle group 10C-8, 34% for the nozzle group 10C-12, 10% for the nozzle group 10C-16, and 0% for the other nozzle groups. The density ratios of the nozzle groups 10C-4, 10C-8, 10C-12, and 10C-16 are 104%, 100%, 100%, and 105%, respectively.

A density ratio of 100% indicates that, in a case where the density value of image data is 128, the density of a recorded image is 128. Thus, a calculation value in the case of recording the image region 123 by using the nozzle groups having the above-described density ratios is calculated by using the following expression.

$$128 \times (1.04 \times 0.16 + 1 \times 0.40 + 1 \times 0.34 + 1.05 \times 0.10) \approx 129.5$$

In this embodiment, the value is rounded to the nearest whole number, and thus the corrected density value of the image region 123 is 130. In this embodiment, the above-described processing is repeatedly performed on all the regions of the image data in units of two rasters, and thereby head shading correction is performed.

Referring to FIG. 12B, the density ratio of the nozzle group 10C-4 for performing recording in the image region 123 in the first scanning operation is 104%, and the density ratio of the nozzle group 10C-4 for performing recording in an image region 124 in the second scanning operation is also 104%. In this embodiment, the value of the density ratio 121 is set to be constant regardless of the uncorrected density value of image data, in order to simplify the description. However, in a case where the corrected density value that is lead from the HS correction one-dimensional LUT 606 varies depending on the uncorrected density value, it is necessary to allow the density ratio 121 of the recording head to vary in accordance with the uncorrected density value.

As a result of performing the above-described HS correction, in a case where the usage ratios (contribution ratios) of individual nozzle groups used for recording in individual image regions of a recording medium are different among the image regions, corrected density values are determined by using the contribution ratios, and thereby density unevenness between image regions can be reduced. With this configuration, density unevenness between image regions caused by variations in ejection volume among individual nozzles can be suppressed.

A contribution ratio table may be stored in a ROM in advance, but it is desirable that a contribution ratio table be generated every time a print job is received. If a contribution ratio table is generated after nozzle groups to be used for recording in individual image regions have been determined, image data can be appropriately corrected even if a combination of nozzle groups used for recording differs between different regions in the sub-scanning direction, such as a center portion and an edge portion of a recording medium.

Specifically, an amount of margin for bordered printing and an amount of image data that lies off the edge of a recording medium for borderless printing are not always constant, and may be set to an arbitrary value in accordance with a user setting or image data. The positional relationship between a recording head and a recording medium varies depending on the amount of margin or the amount of image data that lies off the edge, and accordingly the usage ratios of individual nozzle groups vary. Thus, the ratios of using individual nozzle groups for recording in an image region on a recording medium (contribution ratios) vary depending on a print job in many cases. Thus, a contribution ratio table may be generated every time a print job is received, instead of being stored in the ROM 509.

Method for Determining HS Correction LUT Generation Timing

Next, a description will be given of the processing of calculating dot count values of individual nozzle groups by using a dot count value of image data, which is a characteristic configuration according to an exemplary embodiment. The HS correction one-dimensional LUT used for the above-described head shading correction may be corrected once at the initial stage of usage of a recording head if the density unevenness of the recording head does not vary. Actually, however, continuous ejection of ink may cause variations in ejection volumes and landing positions of individual nozzles of the recording head, which may cause density unevenness that does not occur at the initial stage of usage of the recording head. Thus, in order to increase the effect of head shading correction, it is necessary to perform the flow of generating the HS correction one-dimensional LUT 606 described above with reference to FIG. 8 in consideration of the variation pace of density unevenness depending on the number of ejections of ink, so as to update the values in the LUT.

In this embodiment, dot count values, each obtained by counting the number of dots ejected from a nozzle group, are obtained. If the count value of any of nozzle groups exceeds a preset threshold, it is determined that the timing to update the LUT has come. In this case, the function of counting the number of ejections of ink for each nozzle may be mounted in a printer in order to obtain the count values of individual nozzle groups. However, since many nozzles are provided on a high-density recording head, the method of counting the number of ejections for each nozzle causes the size of a control circuit and a memory for counting to be large, which may result in higher cost and longer image data processing time. On the other hand, the method of counting dots by using image data enables processing to be performed with a constant load regardless of the number of nozzles, and is simpler than the method of counting the number of actually ejected dots for each nozzle. However, in a case where the number of dots of image data is counted, only the dot count value of the entire nozzle array is obtained, and information representing the number of ejections of each nozzle group is not obtained.

Accordingly, in this embodiment, a dot count value of dots ejected from each nozzle group is obtained by using a dot count value of image data and a contribution ratio used for head shading correction, and thereby a correction timing is determined.

FIG. 16 is a flowchart illustrating the processing of obtaining dot count values of individual nozzle groups by using contribution ratios and a dot count value calculated by using image data. In step S161, dot count values of individual image regions are obtained on the basis of image data. In step S162, the dot count values of the individual image regions obtained in step S161 are multiplied by contribution ratios obtained from the contribution ratio table 104, and thereby dot count values of individual nozzle groups are calculated. Step S162 is repeated until it is determined in step S163 that calculation has been performed for the entire image data. In step S164, the sum of dot count values calculated from the image data is stored for each nozzle group in the ROM 509. The ROM 509 stores, for each nozzle group, the cumulative value of dot count values of image data that has been recorded. The sum of count values calculated in step S164 is added to the stored cumulative value.

The above-described processing of calculating dot count values of individual nozzle groups is performed after generating contribution ratios described above with reference to FIG. 11. In this embodiment, the above-described processing is performed after contribution ratios have been generated for the entire image data. The processing may be started at the timing when some contribution ratios have been calculated, and an image may be recorded while simultaneously performing contribution ratio generation processing and dot count value calculation processing for individual nozzle groups. Alternatively, the processing may be performed after the operation of recording the image data has been completed. The calculated dot count values are stored in the ROM 509, like the contribution ratio table 104, or may be stored in the RAM 510.

Figure 13:
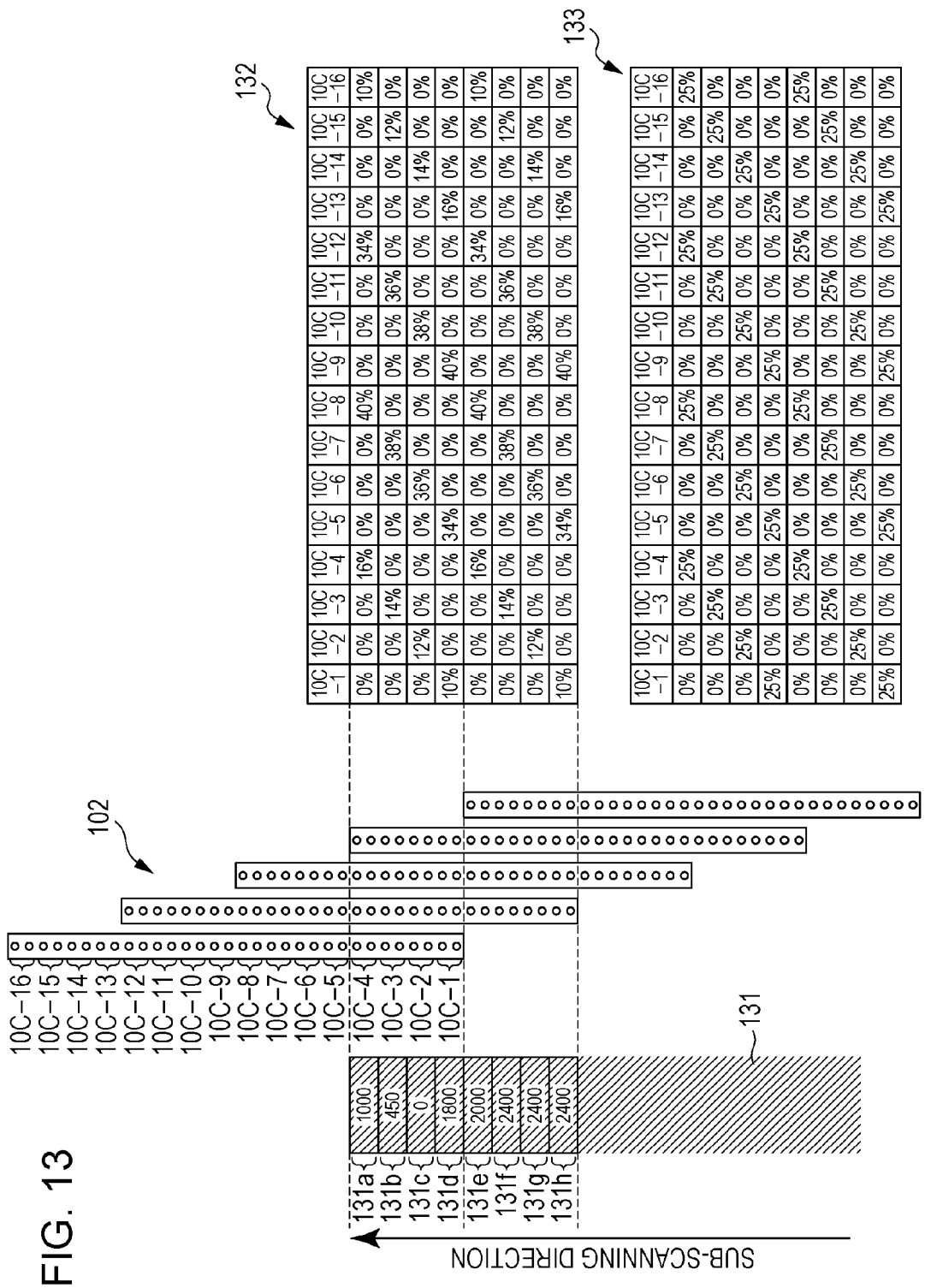
FIG. 13 is a diagram illustrating a method for calculating dot count values for individual nozzle groups.

With reference to FIG. 13, a detailed description will be given of a method for calculating dot count values of individual nozzle groups, described above with reference to FIG. 16. Image data 131 is image data recorded by using cyan ink. The values written in image regions 131a to 131h each represent a dot count value indicating the number of ejections of ink drops from the image region. An image is recorded in the image regions 131a to 131h through four scanning operations of the recording head 102. For example, in the image region 131a, an image is completed as a result of ejection of ink from the nozzle groups 10C-4, 10C-8, 10C-12, and 10C-16 of the recording head 102. A contribution ratio table 132 shows the contribution ratios of the individual nozzle groups corresponding to the image regions 131a to 131h. As described above with reference to FIG. 10, these contribution ratios are the contribution ratios of the nozzle groups 10C-1 to 10C-16 in the image regions 131a to 131h in the case of using the mask pattern 103 in which the recording permission ratios of individual scanning operations vary. The contribution ratio table 133 shows the contribution ratios in the case of using, for the image regions 131a to 131h, a mask pattern in which recording permission ratios of individual scanning operations are uniform.

A method for calculating a dot count value will be described in detail by focusing on the nozzle group 10C-4. In a case where the contribution ratio table 132 is used, the nozzle group 10C-4 ejects 1000×0.16=160 droplets to the image region 131a, and ejects 2000×0.16=320 droplets to the image region 131e. On the other hand, in a case where the contribution ratio table 133, which corresponds to a mask pattern in which the recording permission ratios in four scanning operations are even, is used, the nozzle group 10C-4 ejects 1000×0.25=250 droplets to the image region 131a, and ejects 2000×0.25=500 droplets to the image region 131e. That is, even if the same image data is recorded, the number of dots ejected from each nozzle group varies depending on a mask pattern to be used. Further, even if the same mask pattern is used, the number of dots ejected from each nozzle group varies depending on an image to be recorded.

As described above, with dot counting of image data, the sum of count values indicating the number of dots ejected from each nozzle array can be obtained, but a dot count value for each nozzle group is not obtained. Further, even if the sum of count values of dots ejected from one nozzle array is the same, the case of using a different mask pattern or variation in dot count values of individual nozzle groups depending on image data is not considered. Thus, dot count values of individual unit regions of image data and contribution ratios, which are ratios of using individual nozzle groups to record the image, are used, and thereby the dot count values of individual nozzle groups can be calculated without using the configuration of counting the number of actual ejections of ink drops.

Figure 14A:
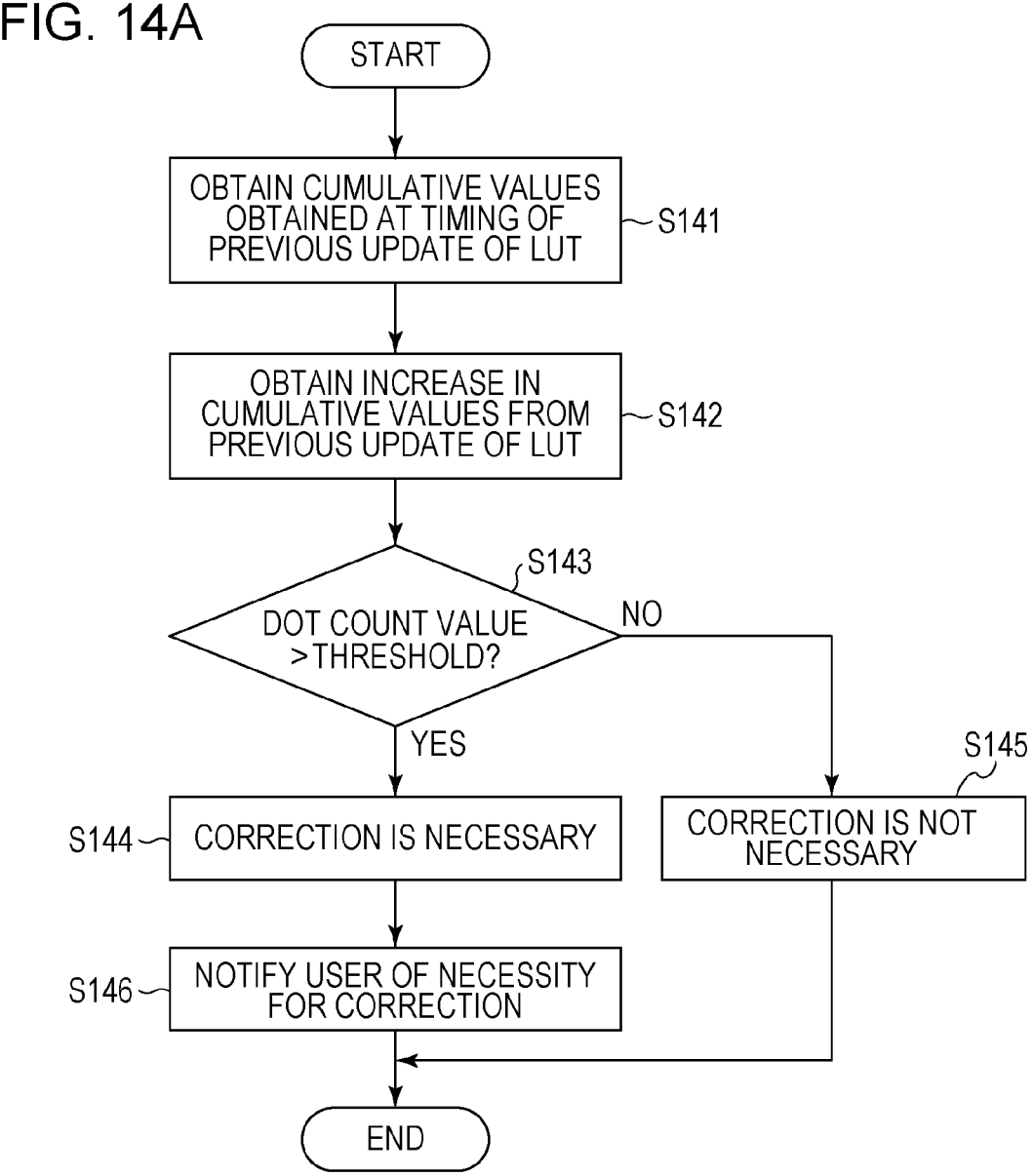
FIG. 14A is a flowchart illustrating the processing of determining a timing to generate an HS correction one-dimensional LUT.

FIG. 14A is a flowchart illustrating a method for determining whether or not it is necessary to generated an HS correction one-dimensional LUT. Here, a detailed description will be given of the case of using the cumulative values of dot count values of individual nozzle groups calculated in the flow illustrated in FIG. 16 and a threshold, with reference to the flowchart illustrated in FIG. 14A. In this embodiment, whether or not it is necessary to update a correction one-dimensional LUT can be internally determined without printing and measuring a test pattern. The determination processing is performed when the power is turned on, when replacement of the recording head is finished, when a recording medium is set to the apparatus, when a print job is finished, when printing of one page is finished, and so forth.

In step S141, the cumulative values obtained at the timing of the previous update of the HS correction one-dimensional LUT 606 are obtained. Subsequently, in step S142, differences between the obtained cumulative values and the cumulative values of dot count values of individual nozzle groups stored in the ROM 509 in step S164 in FIG. 16 are obtained. The differences correspond to the numbers of ink drops ejected from the individual nozzle groups after the previous update of the LUT, and correspond to an increase in the cumulative values. In a case where there is no history of update of the HS correction one-dimensional LUT 606 in the recording head that is currently mounted on the recording apparatus after replacement of the recording head, the sum of dot count values obtained after the replacement of the recording head is obtained as a cumulative increase value.

In step S143, the obtained increase value is compared with a preset threshold. In this embodiment, a maximum value among increase values of dot count values of individual nozzle groups is compared with the threshold. If the increase value is larger than the threshold, the processing proceeds to step S144, where it is determined that correction is necessary. If the increase value is not larger than the threshold, the processing proceeds to step S145, where it is determined that correction is not necessary. If it is determined that correction is necessary, the processing proceeds to step S146, where information indicating that it is necessary to update the HS correction one-dimensional LUT 606 is displayed on an operation panel of the recording apparatus, so as to notify the user.

Figure 14B:
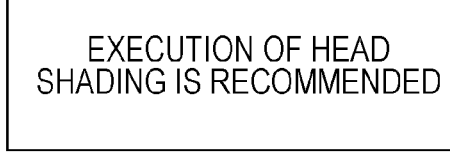
FIG. 14B is a diagram illustrating an operation panel for providing a notification to a user.

FIG. 14B is a schematic diagram of a screen displayed on the operation panel, which notifies the user that it is necessary to perform head shading. The user who has received the notification is capable of determining whether or not to perform head shading. Alternatively, an execution button for providing from the user an instruction to perform head shading may be displayed together with such a notification.

As described above, in this embodiment, ratios of using a plurality of nozzle groups (recording element groups) for recording in a unit region on a recording medium (contribution ratios) are obtained, and a contribution ratio table is generated. Also, by using the number of dots of image data and contribution ratios, dot count values to be recorded for individual nozzle groups are obtained, and the dot count values are stored in the ROM 509. On the basis of the stored dot count values, it is determined whether or not to newly generate and update the HS correction one-dimensional LUT 606. Accordingly, the dot count values of the individual nozzle groups can be obtained by using a simple configuration, compared to the method of directly counting the number of dots ejected from the individual nozzles, and the timing to generate density correction data to be used for head shading correction can be determined with high accuracy.

As the dot count values stored in the ROM 509, all the count values obtained every time an image is recorded may be stored, or only a cumulative value may be stored. At this time, in order to determine the necessity for updating the HS correction one-dimensional LUT 606, it is necessary to obtain an increase value indicating an increase from the timing when the HS correction one-dimensional LUT 606 is previously generated. In the above-described embodiment, cumulative values at the timing of the previous generation are stored, and differences from the current cumulative values are obtained as an increase value. Alternatively, the cumulative values may be reset at the timing of the previous generation, and the currently stored cumulative values may be obtained as an increase value with respect to the previous time.

In step S143, a maximum value of the dot count value in each nozzle group is compared with the threshold, and it is determined that update of the LUT is necessary if the maximum value is larger than the threshold in any of the nozzle groups. However, another determination method may be used. For example, determination may be performed by obtaining a maximum value and a minimum value of an increase value of a dot count value of each nozzle group, and comparing the difference between the obtained maximum value and minimum value with the threshold. Accordingly, a correction timing can be determined before variations in density become a certain value or more due to a difference in usage frequency of nozzle groups. In a case where a contribution ratio is high at a center portion of a nozzle array, variations in ejection volume at the center portion of the nozzle array have a larger influence for the occurrence of density unevenness than variations in ejection volume at an edge portion of the nozzle array. Thus, a coefficient is multiplied depending on the position of a nozzle group to apply a slant, and then a difference is calculated. Accordingly, determination may be performed at a more appropriate timing. Also, in a case where an increase value is larger than the threshold in a certain number or more of nozzle groups or in a case where there are a certain number or more of ink colors for which there is a nozzle group having an increase value larger than the threshold, it may be determined it is necessary to update the HS correction one-dimensional LUT 606. Also, in a case where there is a nozzle group having an increase value larger than the threshold in all ink colors, it may be determined that it is necessary to update the HS correction one-dimensional LUT 606. At this time, the threshold may vary depending on an ink color. The threshold for ink may be decreased as the density unevenness of the ink is more likely to occur or as the density unevenness of the ink is more likely to be perceived.

Regarding a contribution ratio, one contribution ratio can be set in the main scanning direction, and a plurality of contribution ratios of certain sizes can be set in the sub-scanning direction. The size may be within a bandwidth, and may be the same size as the unit of head shading correction. The size of a nozzle group in the contribution ratio table used in head shading correction may be different from the size of a nozzle group in the contribution ratio table used in calculation of dot count values.

In this embodiment, head shading correction is performed on the basis of contribution ratios of individual nozzle groups, and the dot count values of the individual nozzle groups are calculated by using the contribution ratios. However, contribution ratios are not necessarily used for head shading correction. Even if contribution ratios are not used for head shading correction, the timing for head shading correction can be determined by obtaining the dot count values of the individual nozzle groups by using the dot count value of image data and contribution ratios.

In this embodiment, contribution ratios that are calculated from the dot count values of binary image data and binary mask data are used, but the image data and mask data may be multivalued data. In this case, the correspondence between the multivalued data and the dot count values is determined.

In this embodiment, like the unit of head shading correction, the unit of calculation of a dot count value is a nozzle group constituted by two nozzles, but the size of a nozzle group is not limited thereto. A nozzle group may be constituted by one nozzle, or three or more nozzles. The load of calculating a dot count value of each nozzle group can be adjusted by changing the size of the nozzle group. According to this embodiment, the balance between the accuracy of a dot count value and the calculation speed of the dot count value can be changed.

In this embodiment, a description has been given of an example of storing density values as recording characteristic information for individual nozzle groups. Alternatively, measurement results of patches for individual nozzle groups or HS correction LUTs for individual nozzle groups may be stored as recording characteristic information.

Second Exemplary Embodiment

In the first exemplary embodiment, a description has been given of an example of generating the HS correction one-dimensional LUT 606 for each nozzle group on the basis of a measurement result of a test pattern and storing the HS correction one-dimensional LUT 606 in the ROM 509. In a second exemplary embodiment, a description will be given of a method for storing a measurement result of a test pattern in the ROM 509 and generating HS correction data for each image region upon receipt of a print job in the recording apparatus.

In the flowchart illustrated in FIG. 8, steps S801 to S808 are the same as in the first embodiment. In this embodiment, a measurement result of patches is stored in the ROM 509 in step S808, and the processing proceeds to step S810 without performing generation of the HS correction LUT in step S809, and the recording medium is output before finishing the processing. In the ROM 509, a measurement result of patches of a plurality of densities is stored for each nozzle group.

Upon a print job being received by the recording apparatus, a contribution ratio table is generated in accordance with the flowchart illustrated in FIG. 11. On the basis of the generated contribution ratio table and the measurement result of each nozzle group stored in the ROM 509, the HS correction one-dimensional LUT 606 is generated for each image region.

With use of the generated HS correction one-dimensional LUTs 606, multivalued pieces of image data for individual image regions are corrected, and an image is recorded in accordance with the corrected pieces of image data.

With this method, the capacity of the ROM 509 can be saved compared to the case of storing HS correction LUTs, and head shading correction processing can be performed with a simple configuration. In the first embodiment, a constant value is used as a value of a density ratio regardless of the value of image data. On the other hand, in the method according to this embodiment, an HS correction one-dimensional LUT is generated for each image region, and thus appropriate correction can be performed in accordance with a density value.

Third Exemplary Embodiment

In the above-described embodiments, the timing to generate the HS correction one-dimensional LUT 606 is determined by using dot count values of image data and contribution ratios. In a third exemplary embodiment, a description will be given of an example of using dot count values of nozzle arrays of a recording head, instead of dot count values of image data, for determining the timing.

Figure 15:
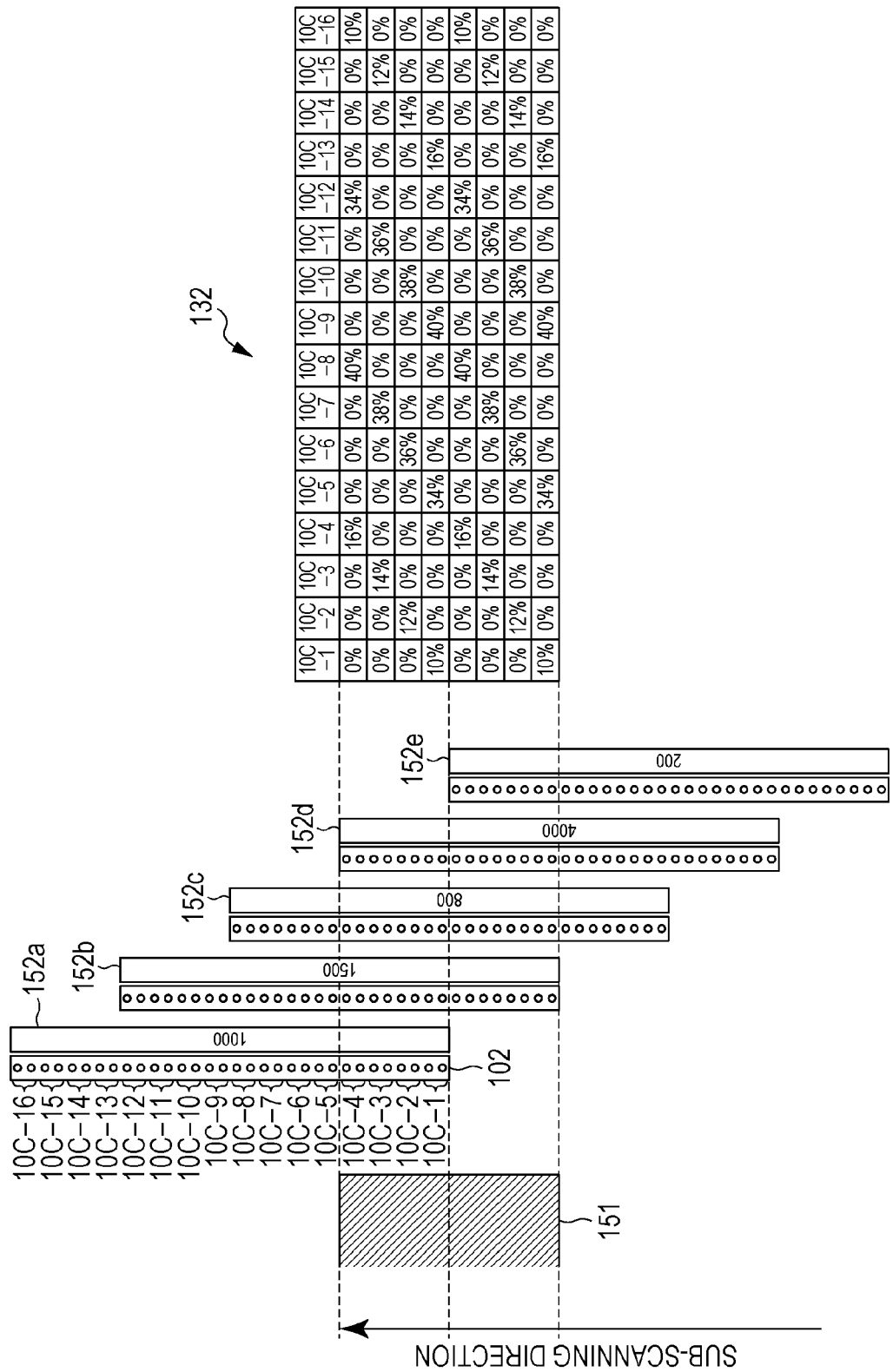
FIG. 15 is a diagram for describing a method for calculating dot count values for individual nozzle groups according to a third embodiment.

FIG. 15 illustrates dot count values 152$a$ to 152$e$ in the recording head 102. The number of ejections in each nozzle array can be easily counted compared to the number of ejections in each nozzle group, and the processing load on the printer is smaller.

Image data 151 has a size corresponding to 16 nozzles in the sub-scanning direction. The dot count values 152$a$ to 152$e$ are dot count values of cyan ink ejected from the recording head 102 in scanning operations of 4-pass recording in order to record the image data 151 on a recording medium. As a result of adding the dot count values 152$a$ to 152$e$ of ejection from the recording head 102 in the five scanning operations illustrated in FIG. 15, the number of ejections of ink that is necessary to record the image data 151 can be calculated. That is, in order to record the image data 151, 1000+1500+800+4000+200=7500 ink dots are ejected.

Here, as shown in the contribution ratio table 132, the nozzle group 10C-4 performs recording with a contribution ratio of 16% in the first and second scanning operations among five scanning operations. The dot count value of dots ejected by the nozzle group 10C-4 in the two scanning operations is 1000×0.16+1500×0.16=400. That is, it is estimated that the nozzle group 10C-4 ejected 400 dots when recording the image data 151.

Dot count values of individual nozzle groups may be obtained in the above-described method, and the obtained dot count values may be added to the cumulative values of dot count values of the individual nozzle groups. Then, as in the determination processing described above with reference to FIG. 14A, the timing to generate (update) the HS correction one-dimensional LUT 606 may be determined.

In this way, count values of individual nozzle arrays are obtained, and the dot count values of individual nozzle groups can be obtained by using the obtained count values and contribution ratios.

Fourth Exemplary Embodiment

In a fourth exemplary embodiment, a description will be given of the case of determining the timing to generate a LUT in color calibration, not the timing to generate a LUT to be used for head shading correction. Color calibration is color correction processing that is performed to suppress variations in colors of an image recorded by a recording head, and recording reference colors (target colors) that are assumed for a printer that is constantly in a stable state. Like the head shading correction, a test pattern including color patches for measurement is output onto a recording medium, the test pattern is measured, and thereby information about colors of an image recorded by the recording head is obtained. Image data is corrected on the basis of the obtained information so that the reference colors are recorded, and thereby color variations can be suppressed. In color calibration, unlike in head shading in which density values of individual nozzle groups are necessary, one density value is obtained for each nozzle array and is used for correction. Head shading correction and color calibration according to this embodiment are the same from the viewpoint of correcting image data by using the same correction value in the raster direction. In color calibration, a correction LUT is prepared for each ink color, not for each nozzle group.

In color calibration, correction is performed by using one density value for each ink color. Thus, if variations in a density value with respect to a dot count value for an entire nozzle array are determined, the timing to generate a LUT can be determined even if there are not dot count values of individual nozzle groups. For example, a threshold used for the determination may be set on the basis of variations in density values of patches recorded in a certain printing mode. If there is no difference in distribution of a recording permission ratio of a mask pattern among printing modes, a LUT generation timing can be determined with sufficient accuracy. However, if there is a big difference in distribution of a recording permission ratio among printing modes, the timing of determination may vary depending on the printing mode to be executed.

With reference to FIG. 17, a description will be given of variations in a correction timing caused by a difference in distribution of a recording permission ratio of a mask pattern. In FIG. 17, as in FIG. 13, 4-pass recording is performed by using the recording head 102 to record image data 171. The image data 171 is recorded by using cyan ink, and the values illustrated in FIG. 17 are dot count values in image regions 171a to 171h. The image data 171 is recorded by performing four scanning operations on each of the image regions 171a to 171h by using the recording head 102. For example, in the image region 171a, ink is ejected from the nozzle groups 10C-4, 10C-8, 10C-12, and 10C-16 of the recording head 102, and thereby an image is completed. The contribution ratios of the nozzle groups corresponding to the individual image regions 171a to 171h are shown in a contribution ratio table 172. The contribution ratio table 172 shows the contribution ratios of the nozzle groups 10C-1 to 10C-16 in the image regions 171a to 171h in the case of using a mask pattern with which recording is completed with the first two scanning operations among four scanning operations. Specifically, regarding the nozzle groups 10C-1 to 10C-8, a value of 50% can be seen in any image region, whereas regarding the nozzle groups 10C-9 to 10C-16, the values are 0% in all the image regions. This means that recording of the image data 171 is completed with the first two scanning operations. The recording permission ratio of a mask pattern corresponding to the contribution ratio is 50% in the first two scanning operations and is 0% in the last two scanning operations.

On the other hand, a contribution ratio table 173 shows the contribution ratios in the case of using a mask pattern, in which the recording permission ratio is even in individual scanning operations, for the image regions 171a to 171h, and the image data 171 is recorded with a contribution ratio of 25% in each scanning operation. The nozzle group 10C-4 records the image data 171 through two scanning operations with a contribution ratio of 50%. With use of the above-described expression, the count value of dots ejected by the nozzle group 10C-4 in two scanning operations can be calculated as 1000×0.5+2000×0.5=1500. That is, it can be understood that the nozzle group 10C-4 ejects 1500 dots to record the image data 171. On the other hand, in a case where the recording permission ratio of the mask pattern is 25% in each scanning operation, the count value of dots ejected by the nozzle group 10C-4 to finish recording can be calculated as 1000×0.25+2000×0.25=750. The count value of dots ejected by each nozzle group largely varies depending on a difference in distribution of a recording permission ratio, although the same image data 171 is recorded.

As described above, in the case of determining the necessity for generating a LUT, the determination may be made by comparing a dot count value with a threshold, as described above with reference to FIG. 14A. The threshold used in step S143 differs between head shading and color calibration. Determination to generate an HS correction LUT and determination of timing of color calibration may be performed in parallel, and, if it is determined that correction is necessary in either of the determinations, a notification indicating the necessity of correction may be provided to the user.

As described above, in a case where a dot count value of a nozzle array is compared with a threshold at the time of determining the timing of color calibration, if the recording permission ratio of the mask pattern to be used varies depending on a printing mode, the determination timing may shift. However, at the time of determining the timing of color calibration, the determination can be appropriately performed by using a dot count value of image data or a dot count value of a nozzle array and contribution ratios described in the above-described embodiments. For example, a threshold may be set on the basis of variations in density in a case where printing is performed by using a mask pattern having an even distribution of a recording permission ratio, and timing determination may be performed if the dot count value of any nozzle group exceeds the threshold, so that the accuracy of timing determination is increased.

Other Embodiments

Additional embodiments can also be realized by a computer of a system or apparatus that reads out and executes computer executable instructions recorded on a storage medium (e.g., computer-readable storage medium) to perform the functions of one or more of the above-described embodiments, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like. In the above-described embodiments, the method for notifying a user of a determination result of the timing at which correction data needs to be updated is not limited to the above-described method. For example, the notification may be displayed on an operation panel of the recording apparatus or on a driver screen, or may be provided by an email via a network. The timing to provide the notification to the user is not limited to after the end of image recording. For example, the notification may be provided during a print job. Alternatively, the necessity for updating correction data may be determined for each color of image data, and a notification may be provided when it is necessary to update the correction data for any color, and a notification need not be provided for a color that is determined not to be important.

In a case where it is determined that correction data needs to be updated, a test pattern may be automatically printed and measured, so as to generate and update correction data. At this time, notification indicating that update has been automatically performed may be provided to the user.

In the above-described embodiments, a description has been given of an example of so-called multipass recording, in which an image is recorded by conveying a recording medium during a plurality of scanning operations. An embodiment is also applicable to so-called full-line recording, in which an image is recorded through one scanning operation by using a recording head including a plurality of nozzle arrays. In the above-described embodiment, a description has been given of an example of using a recording head that has one nozzle array for one ink color, but a recording head including a plurality of nozzle arrays for one ink color may be used. In another embodiment, in the case of recording an image through a plurality of relative scanning operations between a recording head and unit regions on a recording medium, the ratios of usage for the individual relative scanning operations are calculated as contribution ratios. The plurality of relative scanning operations are not necessarily limited to a plurality of scanning operations of the recording head or the recording medium. For example, in the case of recording an image through one scanning operation between a recording head including a plurality of nozzle arrays and a recording medium, a relative scanning operation between a nozzle group in each nozzle array and the recording medium may be regarded as one scanning operation, and one scanning operation of the recording head including the plurality of nozzle arrays may be regarded as a plurality of relative scanning operations.

All types of recording apparatuses that use a recording medium, such as paper, cloth, nonwoven cloth, or an OHP film are applicable. Examples of an applicable apparatus include office equipment such as a printer, copier, or facsimile, and a volume manufacturing machine.

In the above-described embodiments, a description has been given of an example in which the recording control unit 507 that performs characteristic processing is provided inside the inkjet recording apparatus. However, it is not necessary for the recording control unit 507 to be provided inside the inkjet recording apparatus. For example, a printer driver of the host computer (image input unit 502) connected to the inkjet recording apparatus may have the function of the recording control unit 507. In this case, the printer driver generates binary image data on the basis of multivalued input image data received from an application, and supplies the generated binary image data to the recording apparatus. An inkjet recording system including the host computer and the inkjet recording apparatus is also included in the scope of the present disclosure. In this case, the host computer functions as a data supplying apparatus that supplies data to the inkjet recording apparatus, and also functions as a control apparatus that controls the inkjet recording apparatus.

A feature of an embodiment lies in the data processing performed by the recording control unit 507. Thus, a data generating apparatus including the recording control unit 507 that performs the characteristic data processing according to the embodiment of the present disclosure is also included in the scope of the present disclosure. In a case where the recording control unit 507 is provided in the inkjet recording apparatus, the inkjet recording apparatus functions as a data generating apparatus according to an embodiment of the present disclosure. In a case where the recording control unit 507 is provided in the host computer, the host computer functions as a data generating apparatus according to an embodiment of the present disclosure.

The first to fourth exemplary embodiments have been described by using, as an example, an inkjet recording head provided with heating elements for ejecting ink as a recording agent. However, use of an inkjet recording head is not seen to be limiting. In the case of recording an image by using a recording head including recording elements that use a recording agent other than ink, variations in recording density in the sub-scanning direction of a recording element array can be reduced by applying an embodiment of the present disclosure.

Also, a computer program causing a computer to execute the above-described characteristic data processing, and a computer-readable storage medium storing the program are also included in the scope of the present disclosure.

According to an image processing apparatus, an image processing method, and a non-transitory computer-readable storage medium according to an embodiment of the present disclosure, dot count values of a plurality of nozzle groups included in a nozzle array of a recording head can be obtained by using a relatively simple configuration without imposing a heavy load on a printer system, and accordingly the necessity for head shading can be determined with high accuracy.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-082125, filed Apr. 11, 2014, which is hereby incorporated by reference herein in its entirety.

What is claimed is:

1. An image processing apparatus for recording an image on a unit region of a recording medium by performing a plurality of relative scanning operations of the recording medium and a recording head including a plurality of recording elements arranged in a predetermined direction, with ejecting a recording agent for forming dots on the unit region by each of a plurality of recording element groups formed by one or more recording elements, the image processing apparatus comprising:

one or more processors; and
one or more non-transitory computer-readable media storing instructions that, when executed by the one or more processors, cause the one or more processors to perform operations comprising:
a first obtaining step of obtaining image data corresponding to the image to be recorded on the unit region;
a second obtaining step of obtaining a first dot count value corresponding to the image recorded on the unit region based on the image data obtained in the first obtaining step;

a third obtaining step of obtaining a plurality of contribution ratios corresponding to the plurality of recording element groups, wherein each of the plurality of contribution ratios is a use ratio of the respective plurality of recording element groups for recording the image on the unit region;

a fourth obtaining step of obtaining a plurality of second dot count values corresponding to the plurality of recording element groups based on the first dot count value obtained in the second obtaining step and the plurality of contribution ratio corresponding to the plurality of recording element groups obtained in the third obtaining step; and determining, based on the plurality of second dot count values obtained in the fourth obtaining step, whether density correction data for correcting the image data needs to be generated.

2. The image processing apparatus according to claim 1, wherein the fourth obtaining step comprises obtaining each of the plurality of second dot count values by multiplying the first dot count value obtained in the second obtaining step by each of the plurality of contribution ratios obtained in the third obtaining step.

3. The image processing apparatus according to claim 1, the operations further comprising:
generating recording data to be recorded in each of the plurality of relative scanning operations by each of the plurality of recording element groups, based on the image data obtained in the first obtaining step, by using a plurality of mask patterns that include recording permitted pixels in which recording is permitted and recording non-permitted pixels in which recording is not permitted,
wherein each of the plurality of contribution ratios corresponds to a ratio of a number of the recording permitted pixels in each of the plurality of mask patterns.

4. The image processing apparatus according to claim 1, wherein the fourth obtaining step further comprises obtaining, with respect to each of the plurality of recording element groups, a sum of the second dot count values by accumulating the second dot count values obtained after a timing at which the density correction data is generated in a previous time, and
wherein the determining comprises determining whether the density correction data for correcting the image data needs to be generated based on the sum of the second dot count values and a predetermined threshold value.

5. The image processing apparatus according to claim 4, wherein the determining comprises determining that the density correction data needs to be generated in a case where the sum of the second dot count values is larger than the predetermined threshold value in at least one of the plurality of recording element groups, and determining that the density correction data does not need to be generated in a case where the sum of the second dot count values is smaller than the predetermined threshold value in any of the plurality of recording element groups.

6. The image processing apparatus according to claim 1, the operations further comprising:
providing, in a case where it is determined that the density correction data needs to be generated, notification including information of a result of the determination.

7. The image processing apparatus according to claim 1, wherein
the recording head includes a plurality of recording element arrays corresponding to a recording agent of the same color,
the image is recorded through one conveyance of the recording medium with respect to the recording head, and
the plurality of relative scanning operations correspond to recording operations performed by the plurality of recording element arrays with respect to the unit region of the recording medium.

8. An image processing method for recording an image on a unit region of a recording medium by performing a plurality of relative scanning operations of the recording medium and a recording head including a plurality of recording elements arranged in a predetermined direction with ejecting recording agent for forming dots on the unit region by each of a plurality of recording element groups formed by one or more recording elements, the image processing method comprising:
a first obtaining step of obtaining image data corresponding to the image and a use ratio of the respective plurality of recording element groups for recording the image to be recorded on the unit region;
a second obtaining step of obtaining a first dot count value corresponding to the image recorded on the unit region based on the image data obtained in the first obtaining step;
a third obtaining step of obtaining a plurality of contribution ratios corresponding to the plurality of recording element groups, wherein each of the plurality of contribution ratio is the use ratio of the respective plurality of recording element groups for recording the image on the unit region;
a fourth obtaining step of obtaining a plurality of second dot count values corresponding to the plurality of recording element groups based on the first dot count value obtained in the second obtaining step and the plurality of contribution ratio corresponding to the plurality of recording element groups obtained in the third obtaining step; and
a determining step of determining, based on the plurality of second dot count values obtained in the fourth obtaining step, whether density correction data for correcting the image data needs to be generated.

9. An image processing apparatus for recording an image on a unit region of a recording medium by performing a plurality of relative scanning operations of the recording medium and a recording head including a plurality of recording elements arranged in a certain direction, the image processing apparatus comprising:
one or more processors; and
one or more non-transitory computer-readable media storing instructions that, when executed by the one or more processors, cause the one or more processors to perform operations comprising:
storing dot count values for a plurality of recording element groups based on image data of the image and a use ratio of the respective plurality of recording element groups for recording the image, each of the plurality of recording element groups including a different recording element;
determining, based on the dot count values, whether density correction data for correcting the image data needs to be generated; and
generating data to be recorded in each of the plurality of relative scanning operations by using a mask pattern that includes recording permitted pixels in which recording is permitted and recording non-permitted pixels in which recording is not permitted,
wherein the use ratio of the respective plurality of recording element groups for recording the image correspond to a ratio of a region corresponding to the plurality of recording element groups of the recording permitted pixels of the mask pattern.

10. An image processing apparatus for recording an image on a unit region of a recording medium by performing a plurality of relative scanning operations of the recording medium and a recording head including a plurality of recording elements arranged in a certain direction, the image processing apparatus comprising:

one or more processors; and one or more non-transitory computer-readable media storing instructions that, when executed by the one or more processors, cause the one or more processors to perform operations comprising:

storing dot count values for a plurality of recording element groups, based on image data of the image and a use ratio of the respective plurality of recording element groups for recording the image, each of the plurality of recording element groups including a different recording element; and determining, based on the dot count values, whether density correction data for correcting the image data needs to be generated, wherein the determining comprises obtaining, for each of the plurality of recording element groups, a sum of the dot count values that have been stored after a timing at which the density correction data is generated in a previous time, and performing determination in accordance with the sum and a certain threshold.

* * * * *